United States Patent
Rasbornig et al.

(10) Patent No.: US 11,689,326 B2
(45) Date of Patent: Jun. 27, 2023

(54) DIVERSE SENSOR MEASUREMENT WITH ANALOG OUTPUT

(71) Applicant: Infineon Technologies AG, Neubiberg (DE)

(72) Inventors: Friedrich Rasbornig, Klagenfurt (AT); Bernhard Schaffer, Villach (AT); Hans-Joerg Wagner, Villach (AT); Dirk Hammerschmidt, Finkerstein (AT)

(73) Assignee: Infineon Technologies AG, Neubiberg (DE)

( * ) Notice: Subject to any disclaimer, the term of this patent is extended or adjusted under 35 U.S.C. 154(b) by 237 days.

(21) Appl. No.: 16/941,668

(22) Filed: Jul. 29, 2020

(65) Prior Publication Data

US 2022/0038222 A1    Feb. 3, 2022

(51) Int. Cl.
    *H04L 1/22*        (2006.01)
    *H04L 12/40*      (2006.01)

(52) U.S. Cl.
    CPC .......... *H04L 1/22* (2013.01); *H04L 12/40006* (2013.01); *H04L 2012/40273* (2013.01)

(58) Field of Classification Search
    CPC ................. H04L 1/22; H04L 12/40006; H04L 2012/40273; G01L 9/12
See application file for complete search history.

(56) References Cited

U.S. PATENT DOCUMENTS

| | | | |
|---|---|---|---|
| 5,369,349 A * | 11/1994 | Tsuchiya | B62D 5/0487 388/903 |
| 9,346,441 B2 | 5/2016 | Rasbornig et al. | |
| 9,874,609 B2 | 1/2018 | Rasbornig et al. | |
| 10,145,882 B2 | 12/2018 | Rasbornig et al. | |
| 10,187,099 B2 | 1/2019 | Rasbornig et al. | |
| 10,514,410 B2 | 12/2019 | Rasbornig et al. | |
| 2005/0133295 A1* | 6/2005 | Tsutsui | B62D 5/008 180/443 |
| 2013/0103238 A1* | 4/2013 | Yu | B60W 30/18072 903/930 |
| 2013/0245856 A1* | 9/2013 | Kasai | B60R 21/0132 701/1 |
| 2013/0282936 A1* | 10/2013 | Harish | G05B 19/0423 710/63 |
| 2014/0190270 A1* | 7/2014 | Suzuki | G01F 1/6965 73/861.03 |
| 2014/0214970 A1 | 7/2014 | Rasbornig et al. | |

(Continued)

*Primary Examiner* — Hoang-Chuong Q Vu
(74) *Attorney, Agent, or Firm* — Banner & Witcoff Ltd.

(57) ABSTRACT

The described techniques address the issues of latency and lengthy processing times associated with conventional redundant sensor measurement systems that rely upon digital transmission protocols by implementing a diverse analog sensor interface architecture. The described architecture may advantageously use a number of sensor measurement paths that may be independent of one another or share any suitable number of common components to provide varying levels of redundancy. The analog interfaces may provide signal diversity with respect to the use of different types of analog transmission protocols, which may include different signaling interfaces (e.g. differential versus single-ended), different transmission interfaces (e.g. voltage versus current interfaces), and/or the use of different signalization schemes.

23 Claims, 15 Drawing Sheets

(56) References Cited

U.S. PATENT DOCUMENTS

| | | | |
|---|---|---|---|
| 2015/0194992 A1* | 7/2015 | Rasbornig | H04L 69/08 |
| | | | 375/316 |
| 2017/0163366 A1* | 6/2017 | Aichriedler | H04L 12/403 |
| 2019/0039644 A1* | 2/2019 | Bernon-Enjalbert | ............... |
| | | | B62D 5/0493 |
| 2019/0199451 A1* | 6/2019 | Krall | H04B 14/026 |
| 2019/0199558 A1* | 6/2019 | Nguyen | H04L 25/4902 |
| 2020/0156569 A1* | 5/2020 | Sato | B60R 16/0231 |
| 2021/0309167 A1* | 10/2021 | Gourari | B60R 16/023 |
| 2021/0339651 A1* | 11/2021 | Mukae | B60L 58/16 |

* cited by examiner

DIVERSE SENSOR MEASUREMENT WITH ANALOG OUTPUT

TECHNICAL FIELD

Aspects described herein generally relate to sensor interface architectures and, more particularly, to redundant and/or diverse analog interface architectures.

BACKGROUND

Certain applications, such as functional safety systems in vehicles, for instance, utilize redundancy for the transmission of sensor measurement data. The sensor measurement data may represent a physical quantity measured by one or more sensors, the receipt and processing of which being critical to ensure that such safety requirements are met. For example, the Automotive Safety Integrity Level (ASIL) is a risk classification scheme defined by the ISO 26262, and is used to define functional safety for road vehicles. Such functional safety requirements generally specify a minimum time period to detect failures at the IC/sensor level and to provide this information to the applicable system, generally via transmission and processing via an electronic control unit (ECU). Current systems, however, rely upon digital interfaces between the sensors and the ECU, which increases system latency. These additional delays present difficulties to ensure that such strict ASIL minimum time periods are satisfied. Therefore, current sensor measurement interfaces are inadequate.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

Figure 1:
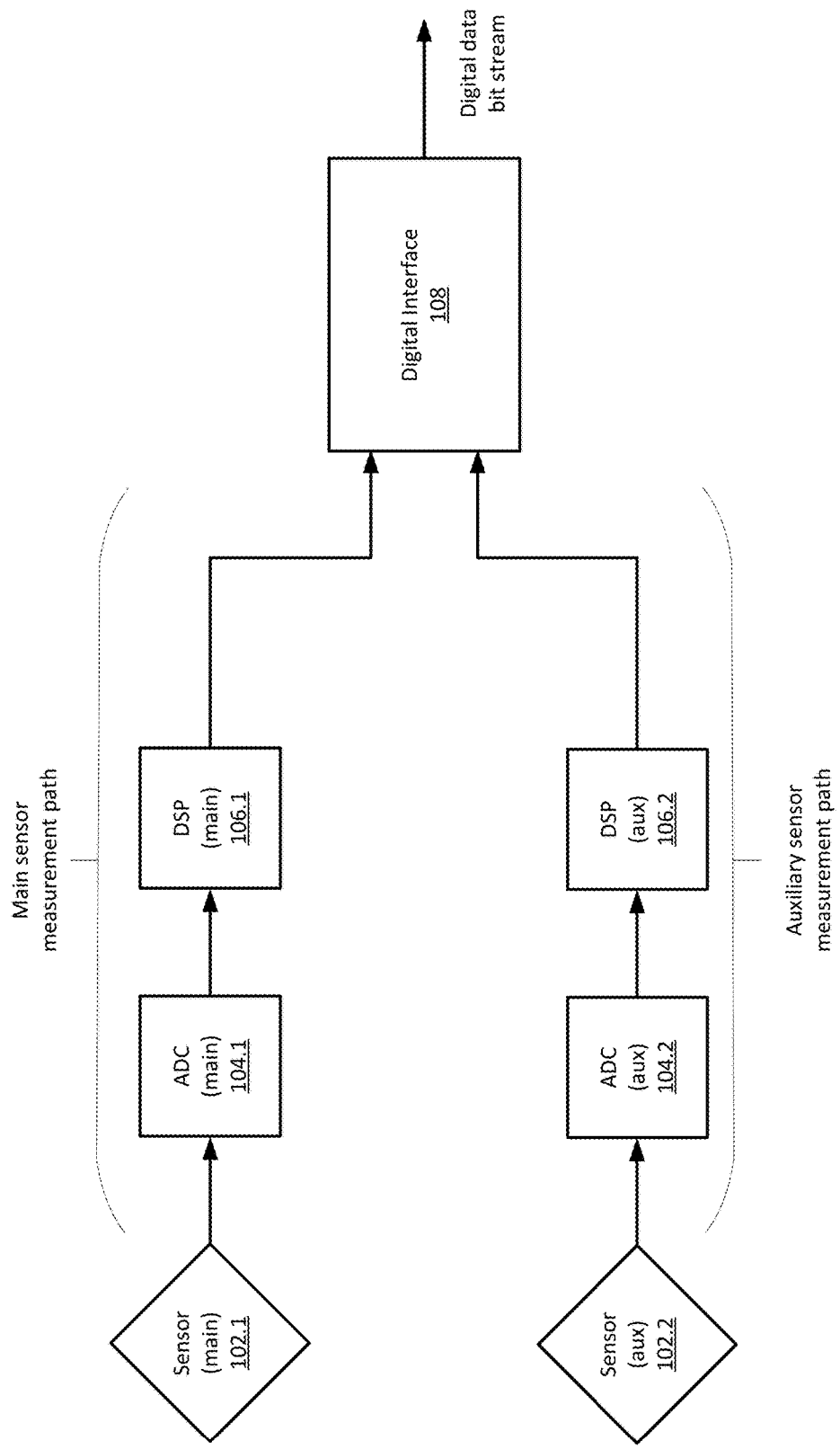
FIG. 1 illustrates an example of a conventional digital sensor interface architecture.

Again, conventional sensor interface systems rely upon digital interfaces between the sensors and the ECU, increasing system latency and presenting additional difficulties to ensure that ASIL minimum time periods are satisfied for functional safety applications. Thus, the embodiments described herein address these issues by implementing a redundant and/or diverse analog sensor interface architecture. Doing so eliminates the delays caused by the conversion of the analog data into a digital transmission protocol and digital processing of the content to recover the encoded sensor data measurements. Thus, the analog sensor interface embodiments described herein provide advantages over the use of conventional digital sensor interfaces by reducing the latency time of the regulation loop within a relevant system (i.e. minimum "dead time" between the change of sensor measurement data and the required time for the system to react to the updated sensor measurement data). Doing so provides distinct advantages at the system level (e.g. P2S), as the reduced latency time leads to a reduction in dead time in the regulation loop, thereby achieving a faster signalization of internal faults to the ECU. In other words, the embodiments described herein facilitate a more efficient and faster adaptation of electrical and mechanical behavior due to new environmental behaviors. Specifically, the use of an analog output interface advantageously facilitates a very small protocol latency time (in the range µs) compared to digital protocols (in the range of 0.5-5.0 ms).

To do so, the embodiments described herein implement an analog sensor interface architecture that provides varying levels of redundancy and/or signal diversity. For instance, and as explained in further detail below, each analog sensor interface may transmit a respective analog signal in accordance with a different type of analog data transmission protocol. These analog data transmission protocols may encompass both the types of interfaces used to generate the transmitted analog signal (e.g., by using current or voltage interfaces), as well as the use of different signalization schemes used to represent the analog signal values (e.g. the transmitted analog signals having voltage values representing physical sensed quantities as an inverse of one other).

Additional redundancy may be introduced via each analog sensor interface being coupled to a dedicated measurement path and/or sensor(s), from which separate sensor measurement data signals are received and used to transmit separate analog signals indicative of each respectively received sensor measurement data. Moreover, each analog sensor interface, along with their respectively-coupled sensor measurement paths, may be physically segregated from one another within a monolithically integrated circuit. In other words, the embodiments described herein may leverage the use of a single monolithically integrated circuit (IC) that obviates the need to use an IC with more than one die, which provides additional advantages regarding ease of manufacturing and reduced cost compared to multi-die ICs.

DETAILED DESCRIPTION

In the following description, numerous specific details are set forth to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

FIG. 1 illustrates a conventional digital sensor interface architecture, in accordance with an embodiment of the disclosure. A common implementation for ASIL and other timing critical applications is to use enhanced sensor measurement architectures (with dual or multiple measurement paths) in which the sensor output data is transmitted via a digital interface (e.g. a single wire digital protocol, SENT, SPC, PSI5 protocols, etc.) to an external controller, such as an ECU, for instance. The auxiliary sensor measurement path is provided to add data redundancy, thereby ensuring that sensor measurements are still received from either the main sensor 102.1 or the auxiliary sensor 102.2 in the event of a failure of the other sensor, sensor measurement path, or components within either sensor measurement path.

Therefore, and as shown in FIG. 1, the digital sensor interface architecture 100 includes a digital interface 108, which is coupled to two separate sensor measurement paths as shown in FIG. 1, which are labeled as main and auxiliary. The main sensor measurement path couples the main sensor 102.1 to the digital interface 108, whereas the auxiliary sensor measurement path couples the auxiliary sensor 102.2 to the digital interface 108. Thus, each of the main and auxiliary sensor measurement paths includes one or more buses or wired interconnections, as well as additional components to facilitate the digital interface 108 receiving data signals representative of the physical quantity measured by each of the main sensor 102.1 and the auxiliary sensor 102.2.

The main sensor measurement path couples the analog output signal generated by the main sensor 102.2, which is indicative of a physical quantity measured by the main sensor 102.1, to a main analog-to-digital converter 104.1. The main ADC 102.2 then converts the analog output signal to digital data that is transmitted to the digital signal processor (DSP) 106.1, which converts the digital data output by the main ADC 104.1 to an appropriate message format that is recognized by the digital interface 108. For instance, the main DSP 106.1 may generate digital data messages that include information with respect to the analog output signals generated by the main sensor 102.1. In other words, the main DSP 106.1 may receive the converted digital data signals from the main ADC 104.1, which represents the physical quantity measured by the main sensor 102.1, and transform the digital data signals to appropriate messages or to an appropriate message format. These messages are then transmitted by the main DSP 106.1 to the digital interface 108, which encodes the message into the appropriate format that is transmitted as digital data and recognized by the appropriate receiving component such as a controller or ECU, for instance. Thus, the digital interface 108 functions to encode digital data into an appropriate bit stream in accordance with a suitable communication protocol such that the digital data bit stream may be received and decoded by the ECU to determine the physical quantity measured by the main sensor 102.1.

The auxiliary measurement path works in a similar manner as described above for the main measurement path. Thus, the digital interface 108 may encode digital data associated with the physical quantities measured by the main sensor 102.1 and the auxiliary sensor 102.2 into separate, sequential bit streams, which are then received and decoded by an ECU, for example, to determine the physical quantity measured by the main sensor 102.1 and the auxiliary sensor 102.2. Although the use of digital protocols allows for checksums to be encoded with the digital data transmissions, this comes at the expense of processing time required for digital data conversion and encoding. For instance, the implementation of the digital interface 108, and the required digital protocols that accompany its use, introduces additional latency time into the system as noted above, which is typically between 0.5-5.0 ms. Moreover, because the digital interface 108 uses a digital communication protocol, the bit time needs to be sufficiently long (typically between 0.5-3.0 μs) to be transmitted over a cable or other interconnection to avoid interference. Further complicating this issue, the number of transmitted bits required corresponds to the number of channels to be transmitted, the digital resolution, and at least a start bit and a checksum. This can result in a required transmission of large amounts (~40 bits) per data frame (e.g. start bit, n sensor values+checksum), adding to the latency issues noted above. Still further, the decoding of the serial data stream requires dedicated hardware for the specific type of digital protocol used for data transmission, and as a result causes the system to consume a great deal of power.

Figure 2A:
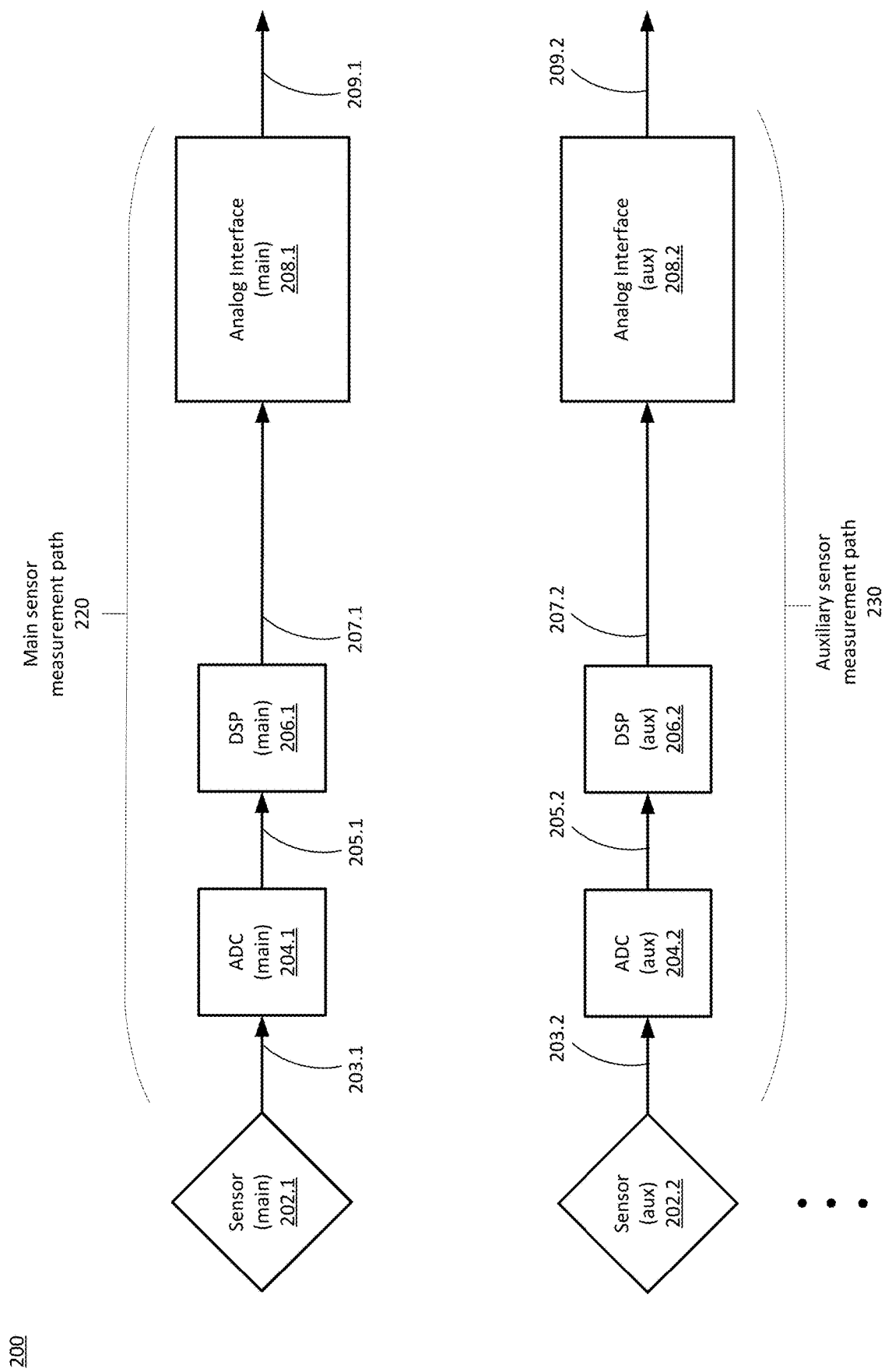
FIG. 2A illustrates an example of a first configuration of an analog sensor interface architecture, in accordance with one or more embodiments of the disclosure.
Figure 2B:
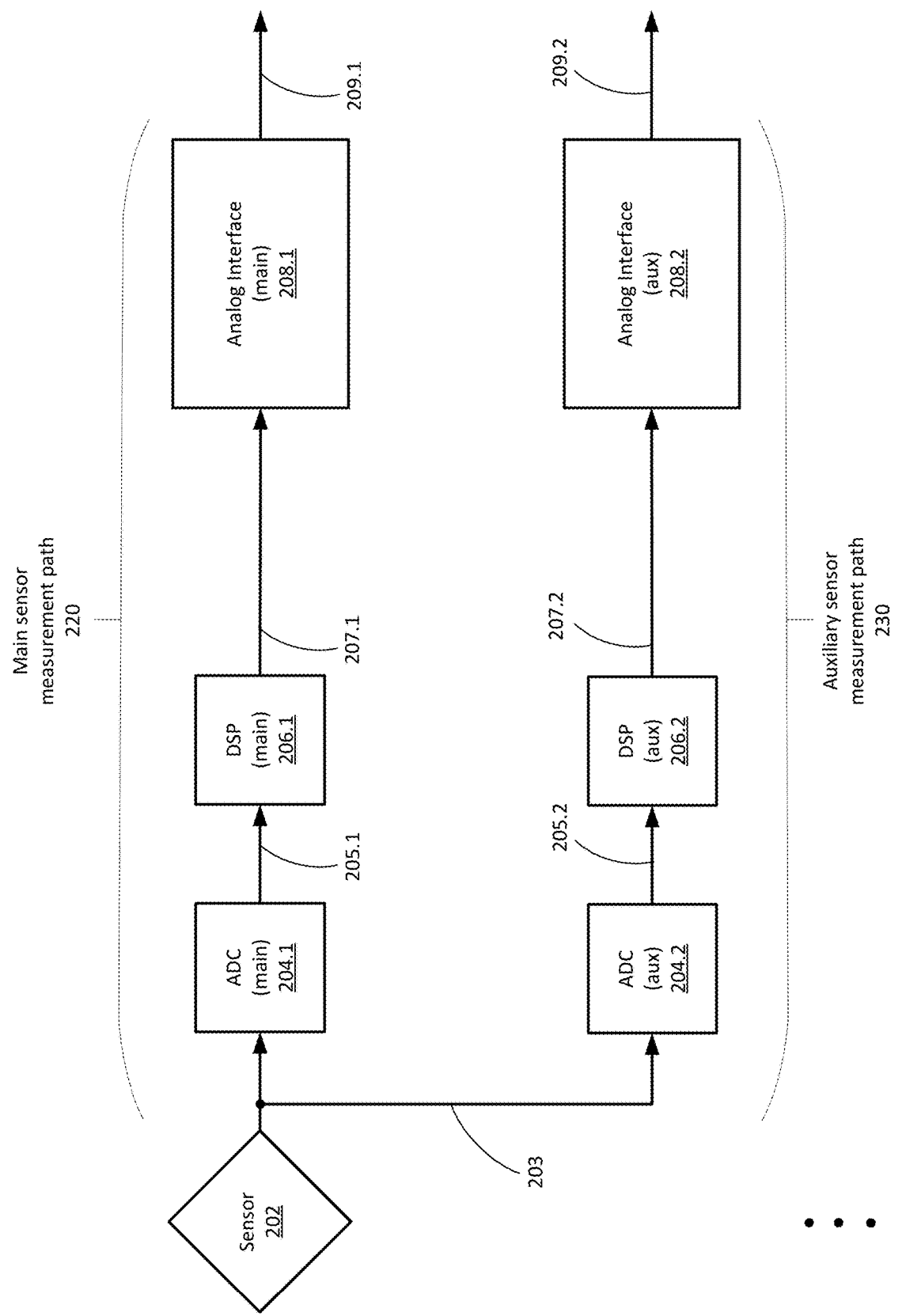
FIGS. 2B-2D illustrate examples of a second configuration of an analog sensor interface architecture, in accordance with one or more embodiments of the disclosure.
Figure 2C:
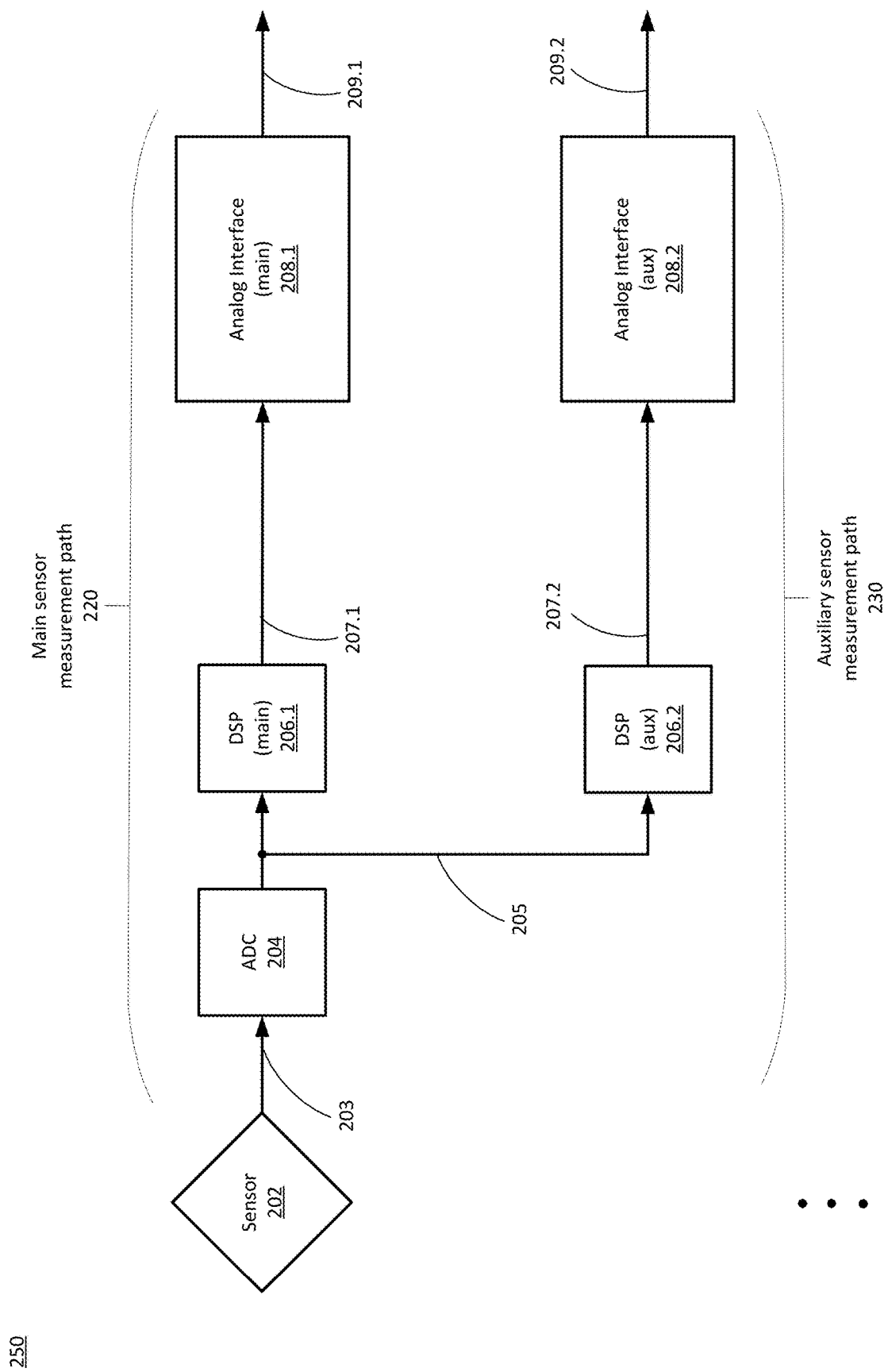
Figure 2D:
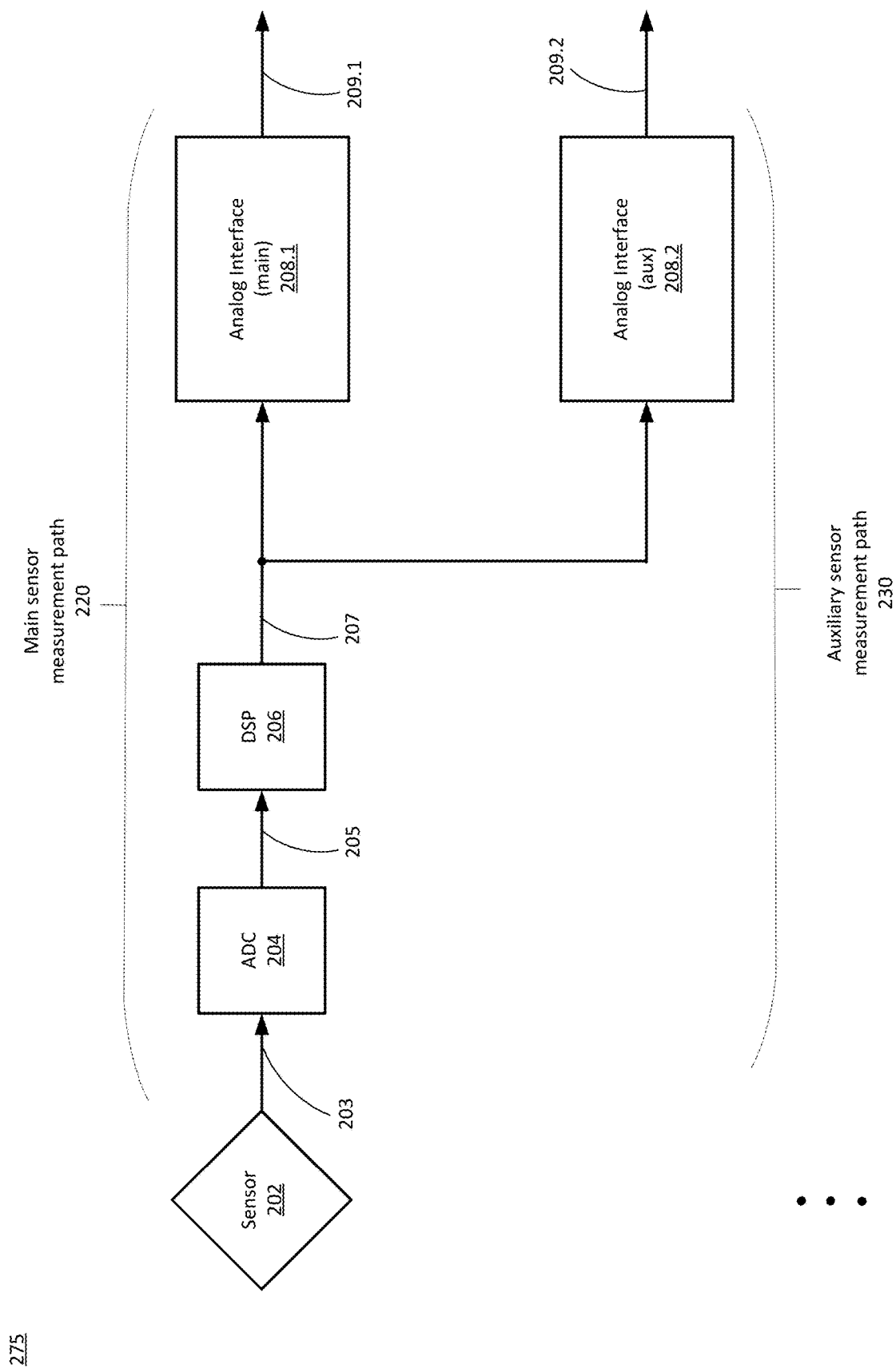

The embodiments described herein aim to address these issues. The embodiments are described with respect to two different configurations of diverse analog sensor interface architectures. In the first configuration, an example of which is shown in FIG. 2A, each sensor measurement path is separate and independent from one another, and each is coupled to a separate sensor such that redundant physical quantities may be measured. In the second configuration, an example of which is shown in FIGS. 2B-2D, the sensor measurement paths may share one or more components and/or sensors. Regardless of the particular type of configuration that is implemented, each analog sensor interface architecture as shown in FIGS. 2A-2D may include one or more buses or wired interconnections components coupling the various components to one another in any suitable manner and configuration.

Although the example analog sensor interface architectures as shown in FIGS. 2A-2D include two sensor measurement paths, this is by way of example and not limitation. Embodiments include the example analog sensor interface architectures as shown in FIGS. 2A-2D including any suitable number of sensor measurement paths in addition to the main sensor measurement path as shown to provide additional redundancy, if desired. Moreover, the sensor measurement paths as shown in FIGS. 2A-2D are provided by way of example and not limitation, and may include additional, alternative, or fewer components as shown in FIGS. 2A-2D to facilitate the functionality described herein with respect to the various embodiments. Furthermore, the various components as shown and described in FIGS. 2A-2D may be integrated with one another or separated to retain their functionality. As an illustrative example, the sensors 202 and ADCs 204 may, in some embodiments, be combined as part of a sensor that outputs digital data versus an analog signal.

FIG. 2A illustrates an example of a first configuration of an analog sensor interface architecture, in accordance with one or more embodiments of the disclosure. The analog sensor interface architecture 200 as shown in FIG. 2A includes two separate and independent measurement paths—a main sensor measurement path 220 and an auxiliary sensor measurement path 230. In the example shown in FIG. 2A, each of the main sensor measurement path 220 and the auxiliary sensor measurement path 230 includes separate respective components, which may be similar or identical to one another, with several exceptions as further discussed below depending upon the type of signal diversity of the analog data transmissions provided by each of the analog interfaces 208.1, 208.2.

In an embodiment, the main sensor measurement path 220 and an auxiliary sensor measurement path 230 may each operate independently of one another and/or operate in parallel with one another. For example, the main and auxiliary sensor measurement paths 220, 230 may operate such that each analog interface 208.1, 208.2 transmits a respective analog signal 209.1, 209.2 in parallel. This may include, for instance, transmitting the analog signals 209.1, 209.2 concurrently or simultaneously with one another or, alternatively, transmitting the analog signals 209.1, 209.2 in accordance with any suitable timing schedule (e.g. sequentially). The parallel transmission of the analog signals 209.1, 209.2 may occur simultaneously excepting for tolerances and/or other timing delays between the main and auxiliary sensor measurement paths 220, 230, which may be due to the use of signal diversity for instance, as further discussed herein. Thus, the transmission of the analog signals 209.1, 209.2 in parallel is understood to mean simultaneous transmission within a defined threshold time window such that at least a portion of one of the analog signals 209.1, 209.2 is transmitted while at least a portion of the other analog signal 209.1, 209.2 is also transmitted.

With continued reference to FIG. 2A, each of the main sensor measurement path 220 and the auxiliary sensor measurement path 230 is coupled to a respective main sensor 202.1 and to an auxiliary sensor 202.2. The sensors 202.1, 202.2 may represent any suitable type of sensor configured to measure a physical quantity and output a respective analog sensor signal 203.1, 203.2, which represents this measured physical quantity. The measured physical quantity may be any suitable type or value depending upon the particular implementation of the sensors 202.1, 202.2. For instance, the sensors 202.1, 202.2 may be implemented as magnetic sensors that measure quantities related to a magnetic field orientation, magnetic flux density, magnetic field strength, etc. When implemented as magnetic sensors, the sensors 202.1, 202.2 may facilitate the measurement of any suitable type of metric using the sensed magnetic quantities such as angular rotation, a present angle of a complementary shaft, angular or linear velocity, etc. Continuing this example, the sensors 202.1, 202.2 may be implemented as Hall elements (e.g. vertical Hall probes and/or lateral Hall plates), magneto resistors (e.g. taking advantage of the anisotropic magnetoresistance (AMR), the giant magnetoresistance (GMR), or the tunnel magnetoresistance (TMR)), etc. The sensors 202.1, 202.2 may be implemented as the same type of sensors (e.g. magnetic sensors) or as different types of sensors with respect to the physical quantity measured, manufacturer, sensor type, sensor interface, etc.

As another illustrative example, the sensors 202.1, 202.2 may be implemented as other types of sensors such as inductive sensors, for instance. Inductive sensors use the principle of magnetic induction to measure various metrics, typically via inductively coupled coil systems. A component of such inductive sensors includes pickup coils, power coils, and target coils. In various embodiments, regardless of the particular implementation, one or more of the components of an inductive sensor may be associated with the sensors 202.1, 202.2, the main sensor measurement path 220, and/or the auxiliary sensor measurement path 230. For example, the sensors 202.1, 202.2 may represent coils, terminals, and/or signal processing circuitry associated with respective pickup coil systems used to individually or redundantly measure physical quantiles associated with an inductive sensor, such as a rotational position of a complementary shaft, for instance. In accordance with such embodiments, portions of the inductive sensor (e.g. the various coils noted above) may be formed as part of the same integrated circuit as the analog sensor architecture 200 or external to the analog sensor architecture 200. Thus, although the sensors 202.1, 202.2, the main sensor measurement path 220 and the auxiliary sensor measurement path 230 (together with their respective components) and analog interfaces 208.1, 208.2 may be formed as a monolithic integrated circuit on a single die, the various embodiments described herein are not limited to these implementations. For instance, and continuing the example of the inductive sensor, the sensors 202.1, 202.2 may be located on a different integrated circuit or form part of a separate component than the other components of the analog sensor architecture 200.

Regardless of the particular implementation of the sensors 202.1, 202.2, embodiments include each sensor 202.1, 202.2 performing a measurement of a physical quantity and generating an electrical analog signal 203.1, 203.2 that represents its respective physical quantity measurement, as further discussed below. In an embodiment, the sensors 202.1, 202.2 are implemented as identical sensors, sensors of the same type, or otherwise measure the same physical quantity to provide sensor data redundancy. This redundancy is represented by the main analog sensor signal 202.1 and the accompanying (i.e. redundant) auxiliary analog sensor signal 202.2, as shown in FIG. 2A.

As shown in FIG. 2A, each of the main sensor measurement path 220 and the auxiliary sensor measurement path 230 includes a respective ADC 204.1, 204.2 and a DSP 206.1, 206.2, which are coupled to respective analog interfaces 208.1, 208.2. The components included in each of the main sensor measurement path 220 and the auxiliary sensor measurement path 230 (e.g. the ADCs 204 and DSPs 206) thus function to couple the respective sensors 202.1, 202.2 to each analog interface 208.1, 208.2. To do so, the components in each of the main sensor measurement path 220 and the auxiliary sensor measurement path 230 may be coupled to one another, to each respective sensor 202.1, 202.2, and to each respective analog interface 208.1, 208.2 via any suitable number and/or type of communication links, which may include any suitable number of wired buses, signal lines, and/or terminals, for example, which are not shown in further detail in the Figures for purposes of brevity. Moreover, each of the main sensor measurement path 220 and the auxiliary sensor measurement path 230 may operate in accordance with any suitable type of communication protocol to facilitate each respective analog interface 208.1, 208.2 receiving sensor measurement data output by each of the sensors 202.1, 202.2.

Each ADC 204.1, 204.2 may be implemented as any suitable type of ADC having any suitable resolution, and may be configured to convert each respective analog sensor signal 203.1, 203.2, which represents the measured physical quantity by each of the sensors 202.1, 202.2, to a digital data value. Each ADC 204.1, 204.2 is configured to output this digital data value as respective digital sensor signals 205.1, 205.2 to each respective DSP 206.1, 206.2. The DSPs 206.1, 206.2, in turn, process the received digital sensor signals 205.1, 205.2 to provide formatted digital data signals 207.1, 207.2 to each respective analog interface 208.1, 208.2. The DSPs 206.1, 206.2 may process the digital sensor signals 205.1, 205.2, for example, using calibration data or other information related to the particular type of sensors 202.1, 202.2 that are implemented for a particular application. Each analog interface 208.1, 208.2 converts the formatted digital data signals 207.1, 207.2 to an appropriate analog value for transmission as transmitted analog signals 209.1, 209.2 in accordance with any suitable type of analog data transmission protocol, as further discussed below.

Although not shown in the Figures for purposes of brevity, the analog interfaces 208.1, 208.2 may include respective digital-to-analog converters (DACs) to facilitate the conversion of the formatted digital data signals 207.1, 207.2 to suitable voltage (when implemented as a voltage interface) or current values (when implemented as a current interface) in accordance with a predetermined signalization scheme, which is discussed in further detail below. As used herein and as further discussed below, the analog data transmission protocol implemented via each analog interface 208.1, 208.2 encompasses both the type of interface used and the signalization scheme. For example, each analog interface 208.1, 208.2 may independently implement a separate analog data transmission protocol that includes the type of signaling interface such as a single-ended interface or a differential interface, as well as the type of transmission technique or transmission interface (e.g. voltage or current interface) used in conjunction with the signaling interface. Additionally, and irrespective of the signaling interface and/or transmission technique that is implemented, the separate analog data transmission protocol implemented via each analog interface 208.1, 208.2 may also encompass the use of a specific "signalization scheme," which is used herein to describe how measured physical quantities of sensor measurement data received via each of the main and auxiliary sensor measurement paths 220, 230 are mapped to specific voltage and/or current values within a range of operating values when transmitted as the analog signals 209.1, 209.2.

As further discussed below, the embodiments described herein utilize signal diversity by varying one or more aspects of the analog data transmission protocol implemented by one (or more) of the analog interfaces 208.1, 208.2 with respect to one other. In other words, the signal diversity described herein may be achieved via the analog interfaces 208.1, 208.2 implementing different types of signal interfaces, transmission interfaces, and/or signalization schemes. However, and although the advantages of using signal diversity is further described herein, the embodiments are not limited to or require that signal diversity be implemented. Instead, the signal diversity may be implemented or, alternatively, the embodiments described herein may rely only upon redundancy among the main and auxiliary sensor measurement paths 220, 230 via the analog interfaces 208.1, 208.2 using the same type of analog data transmission protocol.

Thus, the analog interfaces 208.1, 208.2 may be configured to use any suitable type of signaling interface (e.g. a single ended interface or a differential interface), operate in accordance with any suitable transmission technique (e.g. a voltage or current interface), and use any suitable type of signalization scheme. To do so, the analog interfaces 208.1, 208.2 may implement any suitable type and/or configuration of driver circuitry, interface configuration, etc., to transmit the analog signals 209.1, 209.2, including known techniques, as further discussed below.

As further discussed herein, the different types of analog data transmission protocols may not necessarily include the use of a predetermined communication protocol per se, but may include any suitable type of analog transmission that need not be in accordance with a standardized protocol. For instance, and as further discussed below, the analog interfaces 208.1, 208.2 may transmit their respective analog signals 209.1, 209.2 continuously (or in accordance with a suitable transmission schedule) as new sensor measurement data is received via each of the main and auxiliary sensor measurement paths 220, 230. Doing so may enable the transmitted analog signals 209.1, 209.2 to reflect time-varying voltage or current values within a predetermined range of values indicative of or proportional to the physical quantities measured by the sensors 202.1, 202.2.

Because of the potential variations among the analog interfaces 208.1, 208.2 in terms of different signaling interfaces, transmission techniques, and/or signalization schemes, the DSPs 206.1, 206.2 may optionally process the digital sensor signals 205.1, 205.2 to account for these differences. For instance, the DSPs 206.1, 206.2 may process the received digital sensor signals 205.1, 205.2 such that the formatted digital data signals 207.1, 207.2 are encoded to represent the appropriate data values for use by the analog interfaces 208.1, 208.2 in accordance with a single-ended interface, a differential signal interface, a voltage or current analog data transmission protocol, to account for a particular signalization scheme, etc. Continuing this example, the analog interfaces 208.1, 208.2 may then process the formatted digital data signals 207.1, 207.2 and apply a predetermined type of signal diversity in each case, examples of which are further discussed below.

It is noted that the combination of redundancy and diversity further increases the likelihood of the sensor measurement data being recovered from the transmitted analog signals 209.1, 209.2. For instance, the use of redundant components facilitates independent analog signals 209.1, 209.2 being transmitted such that a failure of a component within one sensor measurement path may not necessarily impact the other, and at least one of the analog signals 209.1, 209.2 will be received. Furthermore, the use of signal diversity as discussed herein may also ensure that an error impacting the generation and/or transmission of one of the analog signals 209.1, 209.2 may be less likely to influence the other. As an added benefit, the use of signal diversity helps ensure that sensor measurement data may be recovered from each of the transmitted analog signals 209.1, 209.2, and a check may optionally be performed of one against the other to guarantee data integrity for safety-critical applications.

In various embodiments, different levels of redundancy may be implemented between the main sensor measurement path 220 and the auxiliary sensor measurement path 230, which may be (but need not be) further combined with the use of signal diversity. In the configuration shown in FIG. 2A, the analog sensor interface architecture 200 includes a maximum level of redundancy in that each sensor measurement path is separate and distinct from one another, includes separate components (e.g. the ADCs 204.1, 204.2 and the DSPs 206.1, 206.2), with each being coupled to a separate sensor 202.1, 202.2. In this way, sensor data redundancy is provided from two distinct sensors 202.1, 202.2, which may be identical to one another such that each sensor measurement path 220, 230 enables the analog interfaces 208.1, 208.2 to transmit the analog signals 209.1, 209.2, each representing the same measured physical quantity via the sensors 202.1, 202.2, respectively.

Although this maximum level of redundancy may be preferable for some applications, it may not be necessary for others. Therefore, embodiments include a second configuration as shown in the examples of FIGS. 2B-2D, in which the main sensor measurement path 220 and the auxiliary sensor measurement path 230 share a common sensor 202. The ADCs 204, DSPs 206, and analog interfaces 208 may operate in the second configuration as shown in FIGS. 2B-2D in a similar or identical manner to the analogous components as described above with respect to the first configuration in the example as shown in FIG. 2A.

However, in the second configuration, the common sensor 202 outputs an analog sensor signal 203, which may be coupled to the separate components in each of the main sensor measurement path 220 and the auxiliary sensor measurement path 230. In this example, redundancy is provided via the use of separate ADCs 204.1, 204.2, DSPs 206.1, 206.2, and along interfaces 208.1, 208.2. In other words, although a redundant sensor is not used in the second configuration, the use of redundant components in each of the main sensor measurement path 220 and the auxiliary sensor measurement path 230 still results in the generation of separate analog signals 209.1, 209.2. Doing so ensures that a component (e.g. a controller or ECU) receives the correct sensor measurement data via one of the transmitted analog signals 209.1, 209.2. For instance, a failure of one or more components in the one of the main or auxiliary sensor measurement paths 220, 230 may cause one of the analog signals 209.1, 209.2 to include invalid data (e.g. outside of the operating range as discussed further below) or not be transmitted at all, whereas the ECU may still receive the sensor measurement data from the transmitted signal 209.1, 209.2 via the operative sensor measurement path.

The number of components shared between the main sensor measurement path 220 and the auxiliary sensor measurement path 230 may be varied, for example, to save die space and/or to reduce costs, recognizing the tradeoff between decreased redundancy and an increased sharing of components between sensor measurement paths. For instance, another example of a second configuration of an analog sensor interface architecture is shown in FIG. 2C, in which the main sensor measurement path 220 and the auxiliary sensor measurement path 230 share a common ADC 204 in addition to the common sensor 202. Such a configuration also results in the transmission of separate analog signals 209.1, 209.2, although an error or malfunction in the ADC 204 will affect each sensor measurement path. This may still be acceptable, however, for less safety critical applications and/or when this is considered an acceptable tradeoff given the low likelihood of such a failure and the desirability of a lower cost of manufacturing and reduction in die space.

A further example of a second configuration of an analog sensor interface architecture is shown in FIG. 2D, in which the main sensor measurement path 220 and the auxiliary sensor measurement path 230 share a common ADC 204 and a common DSP 206 in addition to the common sensor 202. This likewise results in the transmission of separate analog signals 209.1, 209.2, although an error or malfunction in the ADC 204 or the DSP 206 will affect each sensor measurement path. Again, this may be considered an acceptable level of risk in light of cost and space savings for some applications. It is further noted that even when only the analog interfaces 208.1, 208.2 are redundant components as shown in FIG. 2D, this still represents a significant benefit when compared to conventional systems such as the digital sensor interface architecture 100 as shown in FIG. 1, in which a fault of the single digital interface 108 completely disables the functionality of the entire IC/sensor system.

Regardless of the level of redundancy that is implemented, embodiments include the transmission of the separate analog signals 209.1, 209.2 concurrently or in parallel with one another. Moreover, each of the embodiments described herein, including the first and second configurations of the analog sensor interface architecture as discussed with respect to FIGS. 2A-2D may include one or more components (e.g. the sensors 202.1, 202.2, 202, the main sensor measurement path 220, the auxiliary sensor measurement path 230, and/or the analog interfaces 208.1, 208.2), being formed as a monolithic integrated circuit on a single die. In accordance with such embodiments, any suitable number of components included within each of the main sensor measurement path 220 and the auxiliary sensor measurement path 230 (or the entirety of each sensor measurement path) may be physically segregated from one another on the monolithic integrated circuit. In other words, the embodiments described herein do not require dual or multiple dies, each having a separate analog interface.

Furthermore, and regardless of the particular configuration that is implemented, the embodiments as discussed herein provide a significant reduction in system latency by leveraging the use of analog signal transmissions. That is, the analog interfaces 208.1, 208.2 need not transmit the analog signals 209.1, 209.2 in accordance with a standardized protocol, but instead may quickly convey changes in the physical quantities measured by the sensors 202, 202.1, 202.2, etc. via D/A conversion to transmit the analog signals 209.1, 209.2 as voltage values, which may be done in a continuous manner as new sensor measurement data is received from the DSPs 206.1, 206.2. An example of the reduction in latency is shown in further detail in FIGS. 3A-3B, which illustrates example latency timing diagrams of a digital sensor interface architecture versus an analog sensor interface architecture, in accordance with one or more embodiments of the disclosure.

Figure 3A:
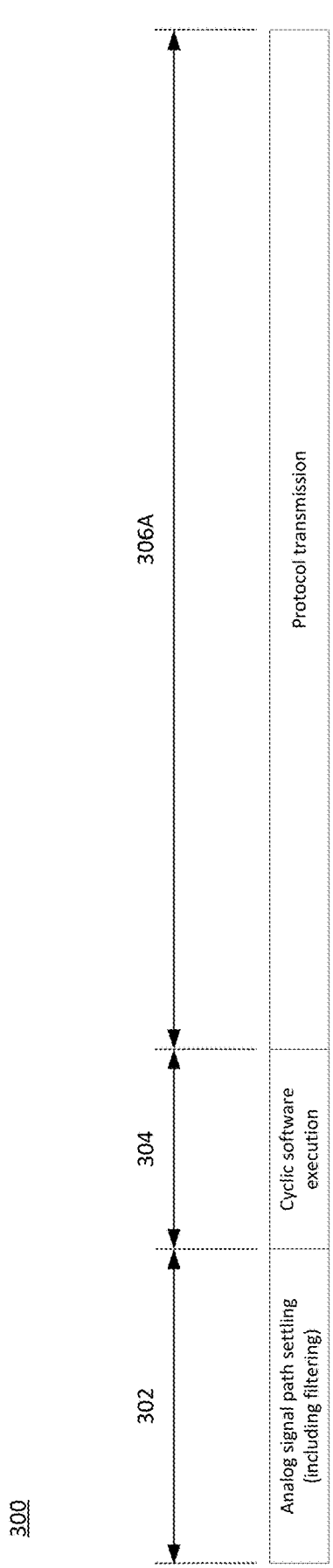
FIGS. 3A-3B illustrate example timing diagrams of a digital sensor interface architecture versus an analog sensor interface architecture, in accordance with one or more embodiments of the disclosure.
Figure 3B:
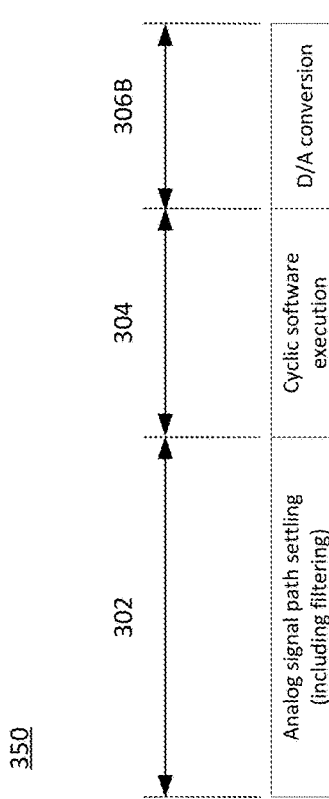

The timing diagram 300 as shown in FIG. 3A may correspond to a digital sensor interface architecture such as the one shown in FIG. 1, whereas the timing diagram 350 as shown in FIG. 3B may correspond to an analog sensor interface architecture such as those shown in FIGS. 2A-2D, for instance. As shown in FIGS. 3A-3B, each sensor interface architecture requires an analog signal path settling time 302 between each sensor 102/202 and the ADC 104/204. This settling time 302 is required such that transients may decay before new sensor data is received and processed, and may include filtering by the ADC 104/204 or a separate filter components (not shown). Additionally, the measurement paths within each sensor interface architecture require a cyclic software execution time 304/404, which is associated with each DSP 106/206 processing the digital data provided by each coupled ADC 104/204. However, the digital sensor interface architecture 100 as shown in FIG. 1 requires a much longer protocol transmission time 306A compared to the digital-to-analog conversion time 306B used by the analog sensor interface architectures as shown in FIGS. 2A-2D. As an illustrative example, the D/A conversion time 306B is on the order of several microseconds (e.g. ~20 µs), compared to the digital protocol transmission time 306A that is several times greater (e.g., ~400 µs).

Thus, the analog sensor interface architectures as shown in FIGS. 2A-2D advantageously need not rely on a specific standardized protocol (either analog or digital), and may instead convert the received the formatted digital data signals 207.1, 207.2 to analog voltage values (albeit via current or voltage interfaces) that are represented in the transmitted analog signals 209.1, 209.2. And because the transmitted analog signals 209.1, 209.2 may represent voltage values, the analog sensor interface architectures as shown in FIGS. 2A-2D may ensure compatibility with a greater number of controllers, as the ability to recognize and convert analog voltage and current values is ubiquitous among the various controllers, processors, and ECUs used throughout many industries. Moreover, because many digital protocols may rely on single wire implementations to save space and cost, the timing diagram 300 as shown in FIG. 3A is repeated for each sensor measurement path in the system, which multiples the time required for an ECU to receive all relevant sensor measurement data in accordance with the number of sensors present in the system. In contrast, the transmission of the analog signals may be performed concurrently or in parallel with one another (although sequential transmissions are also possible), and are received per each analog input terminal of the controller or ECU. Thus, no additional sequential data transfer time is required, further reducing the system latency compared to digital sensor interface architectures.

Again, the analog interfaces 208.1, 208.2 may transmit their respective analog signals 209.1, 209.2 using any suitable type of analog data transmission protocol, which may include the use of specific signalization schemes. Additional details of an example range of values that may be used in accordance with a signalization scheme is shown in further detail in FIG. 4. The diagram 400 as shown in FIG. 4 represents an example of such a signalization scheme, and shows operating range of voltages for an analog data transmission protocol that may be implemented by the analog interfaces 208.1, 208.2 to transmit their respective analog signals 209.1, 209.2.

Figure 4:
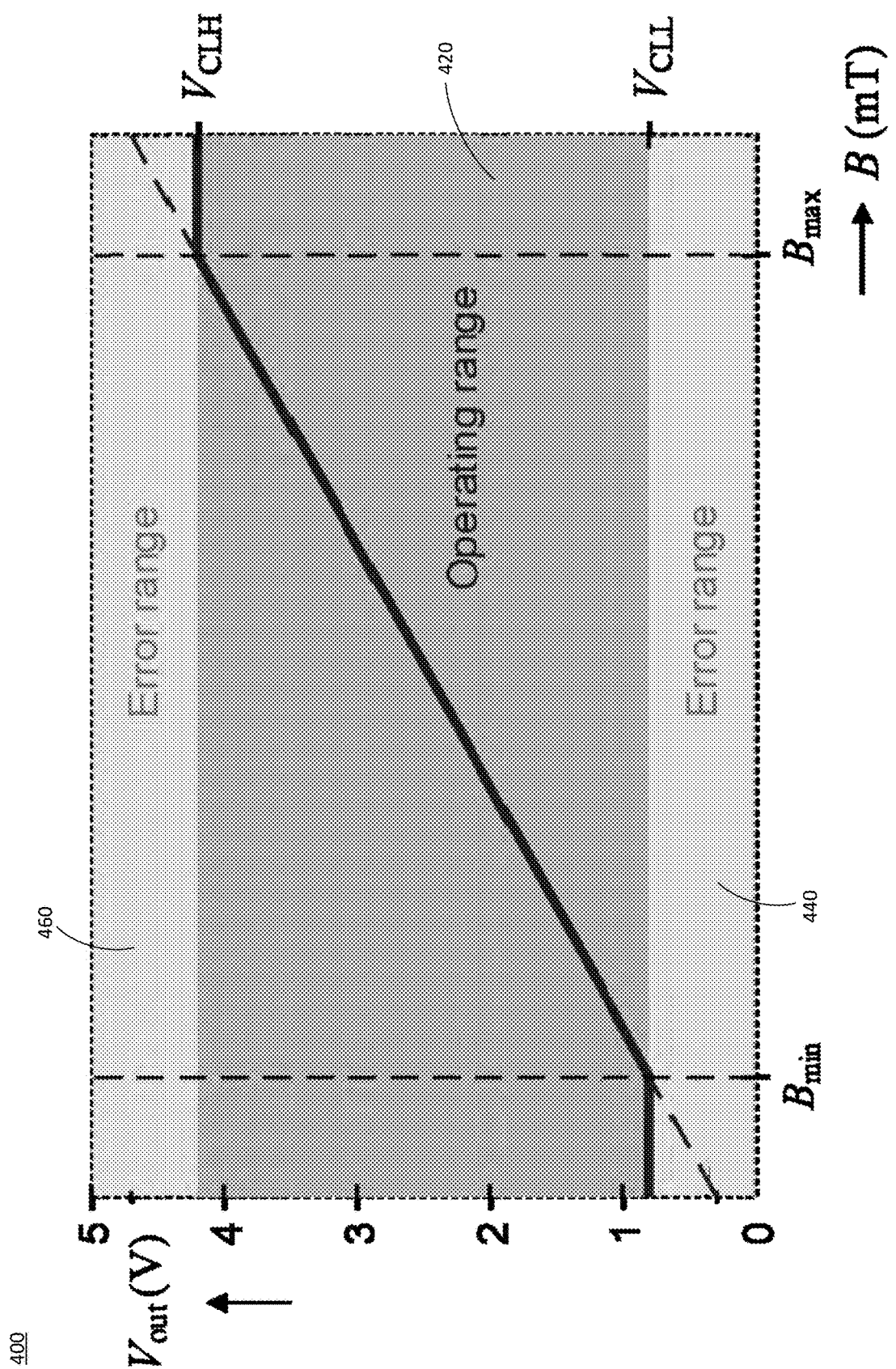
FIG. 4 illustrates an example signalization scheme, in accordance with one or more embodiments of the disclosure.

The diagram 400 as shown in FIG. 4 represents an example of a signalization scheme that maps the physical quantities measured by one of the sensors 202 to an equivalent voltage representation of the analog signals 209.1, 209.2, which may be transmitted by the analog interfaces 208.1, 208.2. In the example shown in FIG. 4, it is assumed that the sensor(s) 202, 202.1, 202.2, etc. are magnetic sensors that measure magnetic field strength in millitesla (mT) between minimum and maximum values represented as $B_{min}$ and $B_{max}$, respectively. Moreover, the example signalization scheme as shown in FIG. 4 represents voltage values that range between 0V and 5V. Of course, the particular type of sensed physical quantity and the range of values are by way of example, and the analog interfaces 208.1, 208.2 may map any suitable physical quantity measured by the sensors 202.1, 202.2 as part of the transmitted analog signals 209.1, 209.2 using any suitable type of signalization scheme, which may include alternate ranges of values, scales, operational ranges, etc. The signalization scheme shown in FIG. 4 may be identified with a single-ended interface or, alternatively, one complementary portion of a differential interface that is implemented by the analog interfaces 208.1, 208.2.

Regardless of the particular type or the signalization scheme that is used, embodiments include the signalization scheme including an operating range 420 and error ranges 440, 460. In the example shown in FIG. 4, the operating range 420 is defined by voltage values that vary between a lower clamping voltage value $V_{CLL}$ and an upper clamping voltage value $V_{CLH}$. Thus, with reference to FIGS. 2A-2D and the example signalization scheme as shown in FIG. 4, the transmitted analog signals 209.1, 209.2 may comprise voltage values that represent sensor measurement data received by the analog interfaces 208.1, 208.2. These voltage values may, for instance, vary between the lower clamping voltage value $V_{CLL}$, which represents a minimum magnetic field $B_{min}$ measured by the sensors 202.1, 202.2, to the upper clamping voltage value $V_{CLH}$, which represents a maximum magnetic field $B_{max}$ measured by the sensors 202.1, 202.2. In this example, the voltage linearly varies within the operating range between the lower clamping voltage value $V_{CLL}$ and the upper clamping voltage value $V_{CLH}$ to indicate magnetic field strengths measured by the sensors 202.1, 202.2 between the maximum and minimum magnetic field strength values $B_{min}$, $B_{max}$.

As shown in FIG. 4, the example signalization scheme includes a lower error range 440 that is less than the lower clamping voltage value $V_{CLL}$, and an upper error range 460 that is greater than the upper clamping voltage value $V_{CLH}$. The lower and upper clamping voltage values $V_{CLL}$, $V_{CLH}$, and thus the lower and upper error ranges 440, 460, may be defined in accordance with the circuity implemented via the analog interfaces 208.1 208.2. For instance, the lower and upper clamping voltage values $V_{CLL}$, $V_{CLH}$ may represent voltage limits that are a result of safety clamping circuits placed at the output of a transistor or other suitable driver implemented by the analog interfaces 208.1, 208.2. In the event that a current interface is used, the analog interfaces 208.1, 208.2 may alternatively implement current limiters that yield the respective operating range 420 and lower and upper error ranges 440, 460. The analog interfaces 208.1, 208.2 may be implemented with any suitable type of clamping or limiting mechanisms, including known implementations, to provide any suitable operating range 420 for a particular signalization scheme.

Therefore, the selection of operating range 420, as well as the lower and upper error ranges 440, 460, may form part of a predetermined signalization scheme used to transmit the analog signals 209.1, 209.2. Thus, a component receiving the analog signals 209.1, 209.2 (e.g. a controller, ECU, etc.) may be programmed or otherwise configured to recognize and differentiate between analog signals 209.1, 209.2 that represent valid sensor measurement data (when the analog signals are within the operating rage 420) and those that represent an error state (when the analog signals are outside the operating rage 420). This advantageously allows the analog interfaces 208.1, 208.2 to convey error state information without the use of a digital protocol or digitally-encoded messaged to do so.

For instance, digital interface architectures as discussed above with reference to FIG. 1 may indicate a failure is detected in accordance with digital protocols, and the digital transmitted bit stream may convey the error state by setting all data bits to "0" or to "1." Because the embodiments described herein use analog interfaces 208.1, 208.2 that transmit analog signals 209.1, 209.2, an analogous approach may be facilitated by leveraging the operating range 420. As an illustrative example, the analog signals 209.1, 209.2 may indicate an error condition by setting the output voltage to the positive supply (VDD) or ground (GND) or, alternatively, a fault in the signal lines used to transmit the analog signals 209.1, 209.2 may result in the voltage of the signal line being pulled to VDD or GND. Because the receiving component is aware of the operating range 420, the voltage value of the received analog signals 209.1, 209.2 may be detected by an external safety mechanism via an identification of the voltage value of the analog signals 209.1, 209.2 as being outside the operating range 420.

Figure 5A:
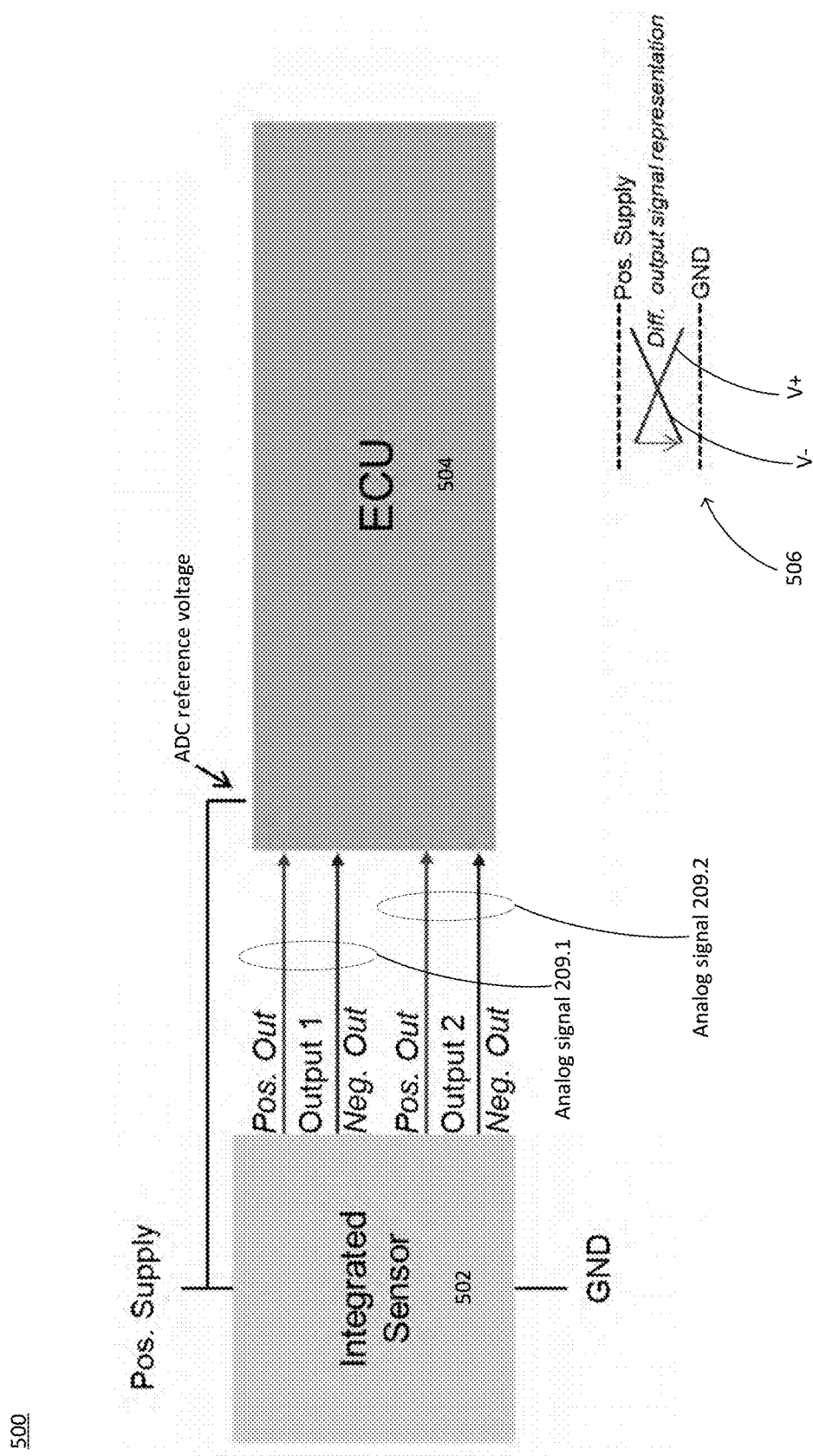
FIG. 5A illustrates a block diagram of an example of a differential signal transmission for an analog sensor interface architecture, in accordance with one or more embodiments of the disclosure.

Again, embodiments include the analog interfaces 208.1, 208.2 transmitting the analog signals 209.1, 209.2 using any suitable type of signaling interface, such as a single-ended interface or differential interface. The analog interfaces 208.1, 208.2 may transmit the analog signals 209.1, 209.1 using the same type of signaling interface or using different interfaces, in various embodiments. When the same signaling interface is implemented by each of the along interfaces 208.1, 208.2, signal diversity may be achieved via different signalization schemes. As an example, FIG. 5A illustrates a block diagram showing a differential signal transmission for a diverse analog sensor interface architecture, in accordance with one or more embodiments of the disclosure. The integrated sensor 502 may be identified with the sensor(s) 202, the main sensor measurement paths 220, and the auxiliary sensor measurement paths 230, as shown and discussed above with respect to FIGS. 2A-2D. Thus, the analog signals 209.1, 209.2 as shown in FIG. 5A may be output from each respective analog interface 208.1, 208.2, as discussed herein.

In the example shown in FIG. 5A, each of the analog interfaces 208.1, 208.1 transmits a respective analog signal 209.1, 209.2 as a pair of differential signals, which provides an increased signal-to-noise ratio compared to a single-ended interface. For instance, each analog signal 209.1, 209.2 is transmitted as a pair of signals comprising a positive output (V+) signal and a negative output (V−) signal. In various embodiments, the V+ and V− signals may each conform to a predetermined type of signalization scheme as discussed above with reference to FIG. 4, i.e. each analog signal 209.1, 209.2 may be transmitted within a predetermined operating range when valid sensor measurement data is transmitted. Continuing this example, as shown in the inset 506 in FIG. 5A, each of the differential V+ and V− signals may conform to specific signalization scheme used for the transmission of the analog signals 209.1, 209.2 in accordance with a differential signaling interface. That is, the V+ and V− signals may represent a mapping of physical quantities measured by the sensor or sensors coupled to each sensor measurement path in a differential manner and within a valid operating range, with the V+ and V− signals representing an inverse of one another such that the ECU 504 may subtract the two differential signals to recover the actual sensor data measurement. That is, the V+ and V− signals for each of the transmitted analog output signals 209.1, 209.2 are received by an ECU 504, which extracts the actual sensor measurement value (i.e. the physical quantity measured by the sensor) by calculating the difference between the V+ and V− signals. As further discussed below, the use of signal diversity among the analog signals 209.1, 209.2 increases the chances of the sensor measurement data being recovered in the event of a failure.

Figure 5B:
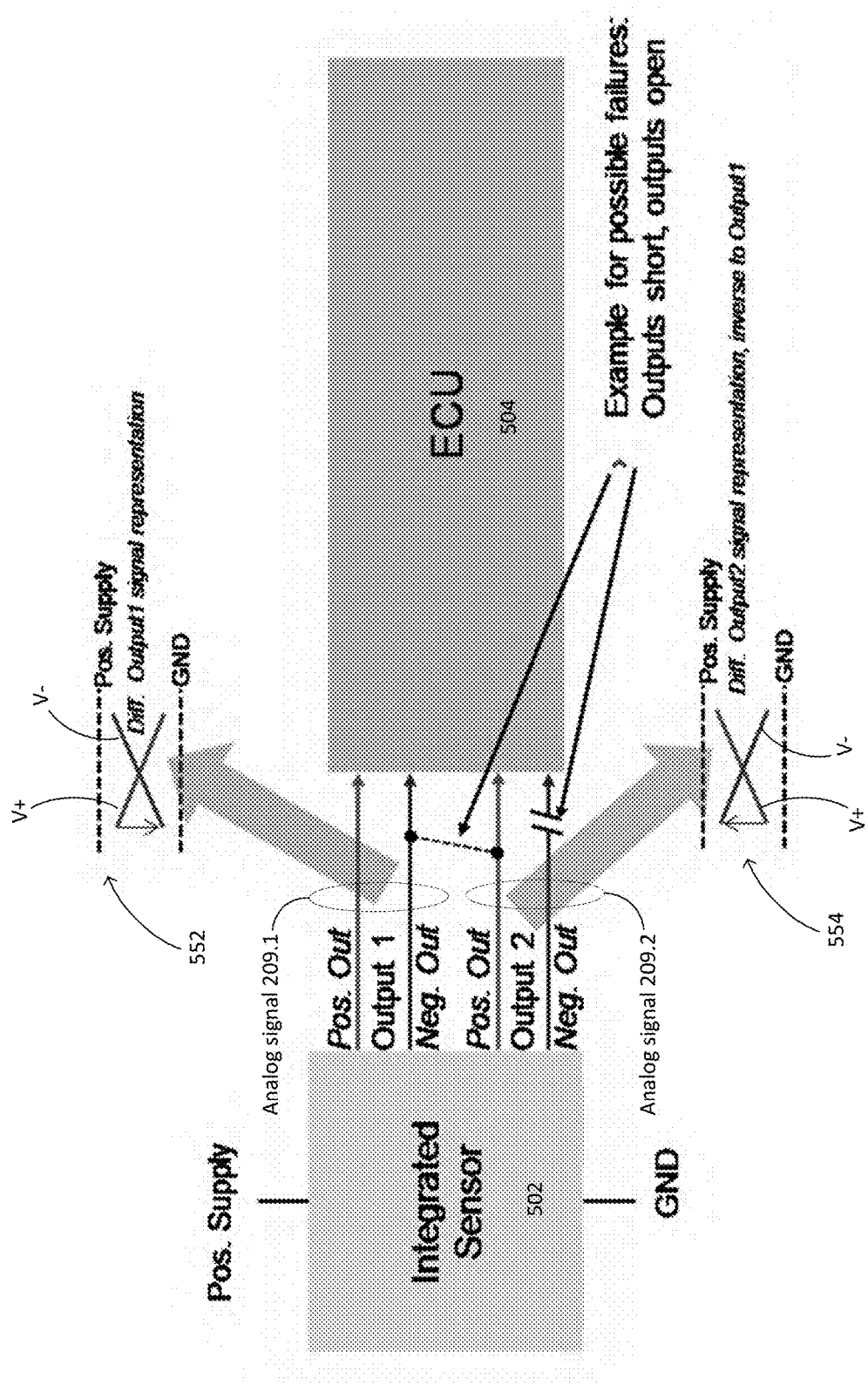
FIG. 5B illustrates a block diagram showing additional signal diversity details implemented with the differential signal transmission as shown in FIG. 5A and indicating robustness to potential failures, in accordance with one or more embodiments of the disclosure.

For example, and as shown in further detail in FIG. 5B, the analog interfaces 208.1, 208.2 may provide signal diversity by implementing different types signalization schemes to transmit the analog signals 209.1, 209.2, which may include a mapping such that the differential V+ and V− signals used to transmit the analog signals 209.1, 209.2 are inverses of one another in each case. With continued reference to FIG. 5B, this may include the V+ and V− signals for one of the analog signals 209.1, 209.2 having a signalization scheme such that the V+ signal decreases with increasing sensed physical quantities and the V− signal increases with increasing sensed physical quantities (as shown in the inset 552). In the example shown in FIG. 5B, analog signal 209.1 corresponds to this type of signalization, whereas the analog signal 209.2 corresponds to an inverse of this signalization, with the V+ signal increasing with increasing sensed physical quantities and the V− signal decreasing with increasing sensed physical quantities (as shown in inset 554).

To provide yet another illustrative example, which is not shown in the Figures for purposes of brevity, the analog interfaces 208.1, 208.2 may implement different types of signalization schemes by using a different scale and/or or different valid operating ranges to transmit the analog signals 209.1, 209.2. For instance, two or more positive supplies may be used having unequal voltage levels such that the V+ and V− signals for one of the analog signals 209.1, 209.2 represents a larger operating range compared to the other. As another example, a single positive supply may be used, but the upper and lower clamping voltage values may be different among the analog signals 209.1, 209.2 such that the analog signals 209.1, 209.2 are transmitted using different valid operating ranges within the voltage range defined by the positive supply and ground. The use of the different scales and/or different operating ranges may be used in addition to the aforementioned use of inverse signalization schemes to provide additional signal diversity, or as an alternative to the inverse signalization scheme, in various embodiments.

In any event, the signal diversity with respect to the manner in which the analog signals 209.1, 209.2 are transmitted facilitates an increased likelihood of the sensor measurement data being received and recovered by the ECU 504. For example, and with continued reference to FIG. 5B, a short of two of the signal lines used to transmit the analog signals 209.1, 209.2 may still allow the ECU 504 to recover the sensor measurement data. For instance, FIG. 5B illustrates a short between the V− (signal 209.1) and the V+ (signal 209.2). However, the ECU 504 still receives the V+ signal associated with analog signal 209.1 and the V− signal associated with the analog signal 209.2. When a single positive supply is used, and because the ECU 504 is configured with knowledge of the signalization scheme used to transmit the analog signals 209.1, 209.2, the ECU 504 may still recover the sensor measurement data using the two received signals (V+ from analog signal 209.1 and V− from analog signal 209.2), under these circumstances, as the two failures shown in FIG. 5B are independent examples and are assumed to not occur at the same time. As another example, and also illustrated in FIG. 5B, one or more of the signal lines used to transmit the analog signals 209.1, 209.2 may fail and result in an open line condition. However, as long as at least one complementary pair of V+ and V− signals are received from any combination of the signal lines associated with the analog signals 209.1, 209.2, the ECU 504 may recover the sensor measurement data as a result of the implementation of the signal diversity.

Figure 6A:
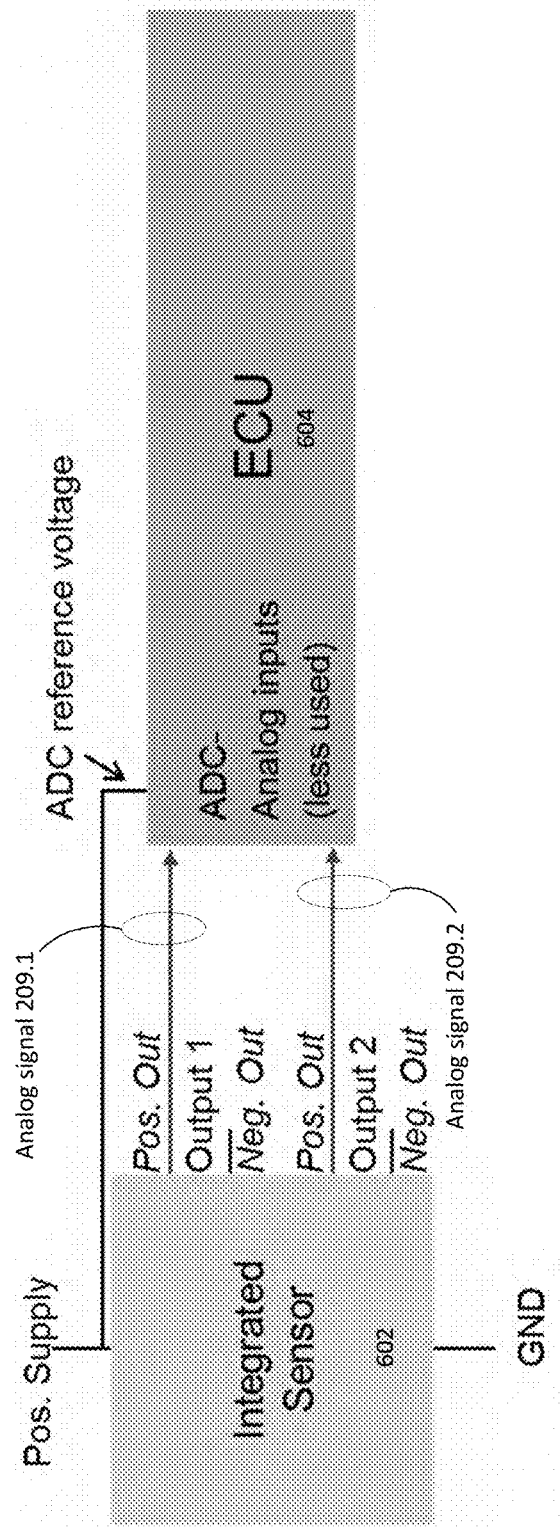
FIG. 6A illustrates a block diagram of an example of a single-ended signal transmission for an analog sensor interface architecture, in accordance with one or more embodiments of the disclosure.
Figure 6B:
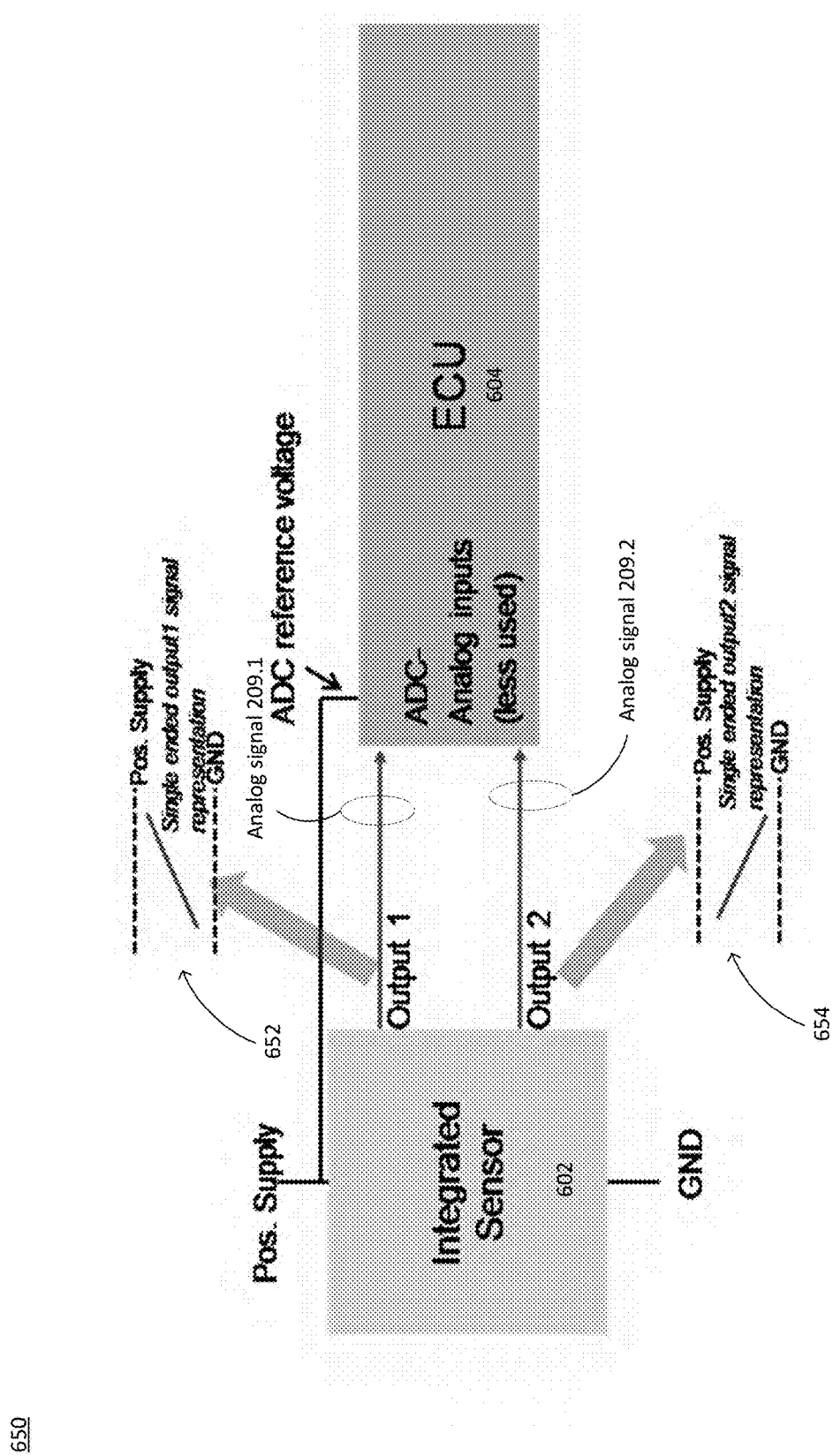
FIG. 6B illustrates a block diagram showing additional signal diversity details implemented with the single-ended signal transmission as shown in FIG. 6A, in accordance with one or more embodiments of the disclosure.

As discussed above, the analog interfaces 208.1, 208.2 may alternatively transmit the analog signals 209.1, 209.2 in accordance with single-ended signal interface. An example of a single-ended interface implementation is shown in FIGS. 6A-6B. The integrated sensor 602 as shown in FIG. 6A may be similar or identical to the integrated sensor 502 as discussed above with respect to FIGS. 5A-5B, with the exception that the analog interfaces 208.1, 208.2 in this example implement single-ended interfaces. Likewise, the ECU 604 as shown in FIG. 6A is similar or identical to the ECU 504 as discussed above with respect to FIGS. 5A-5B, with the exception of operating to processing the analog signals 209.1. 209.2 in accordance with a signalization scheme associated with the single-ended interface.

As shown in FIG. 6A, the V− signal lines may be unused as compared to the differential interface embodiments. Alternatively, the V− signal lines may be completely absent (e.g. not included as part of the sensor measurement paths 220, 230 as discussed with reference to FIGS. 2A-2D). In some embodiments, the V− signal lines may be present and simply unused to allow for the manufacture of a single, consolidated integrated sensor with analog interfaces 208.1, 208.2 that may operate in accordance with either a differential interface or a single-ended interface as desired for a particular application. The use of the single-ended interface as shown in FIG. 6A may be particularly desirable, for instance, to save cost and space required for the additional V− signal lines (i.e. cabling) and to reduce the number of ADC inputs required at the ECU 604, recognizing the acceptable tradeoff in a reduced signal-to-noise ratio compared to a differential interface when doing so.

In an embodiment, the same types of signal diversity that may be implemented in accordance with the differential interface embodiments as discussed above may also be applicable to the single-ended interface embodiments. For instance, the analog interfaces 208.1, 208.2 may transmit the respective analog signals 209.1, 209.2 using different signalization schemes such that the analog signals 209.1, 209.2 are transmitted using a mapping that are inverses of one another, using different voltage scales, using different valid operating ranges, etc. Again, and as further discussed below, the use of signal diversity between the analog signals 209.1, 209.2 increases the chances of the sensor measurement data being recovered in the event of a failure.

Turning now to FIG. 6B, the insets 652, 654 show the analog signals 209.1, 209.2 having a specific signalization scheme as part of a predetermined analog data transmission protocol. Continuing this example, the analog signal 209.1 has a signalization scheme such that the voltage values increase with increasing sensed physical quantities, and the analog signal 209.2 has a signalization scheme such that the voltage values decrease with increasing sensed physical quantities, although this is by way of example and any suitable signalization scheme and mapping may be implemented in accordance with the embodiments described herein. In other words, the analog interfaces 208.1, 208.2 may provide signal diversity in this example by transmitting the analog signals 209.1, 209.2 with a signalization scheme such that the voltage values used to transmit the analog signals 209.1, 209.2 are inverses of one another.

Figure 6C:
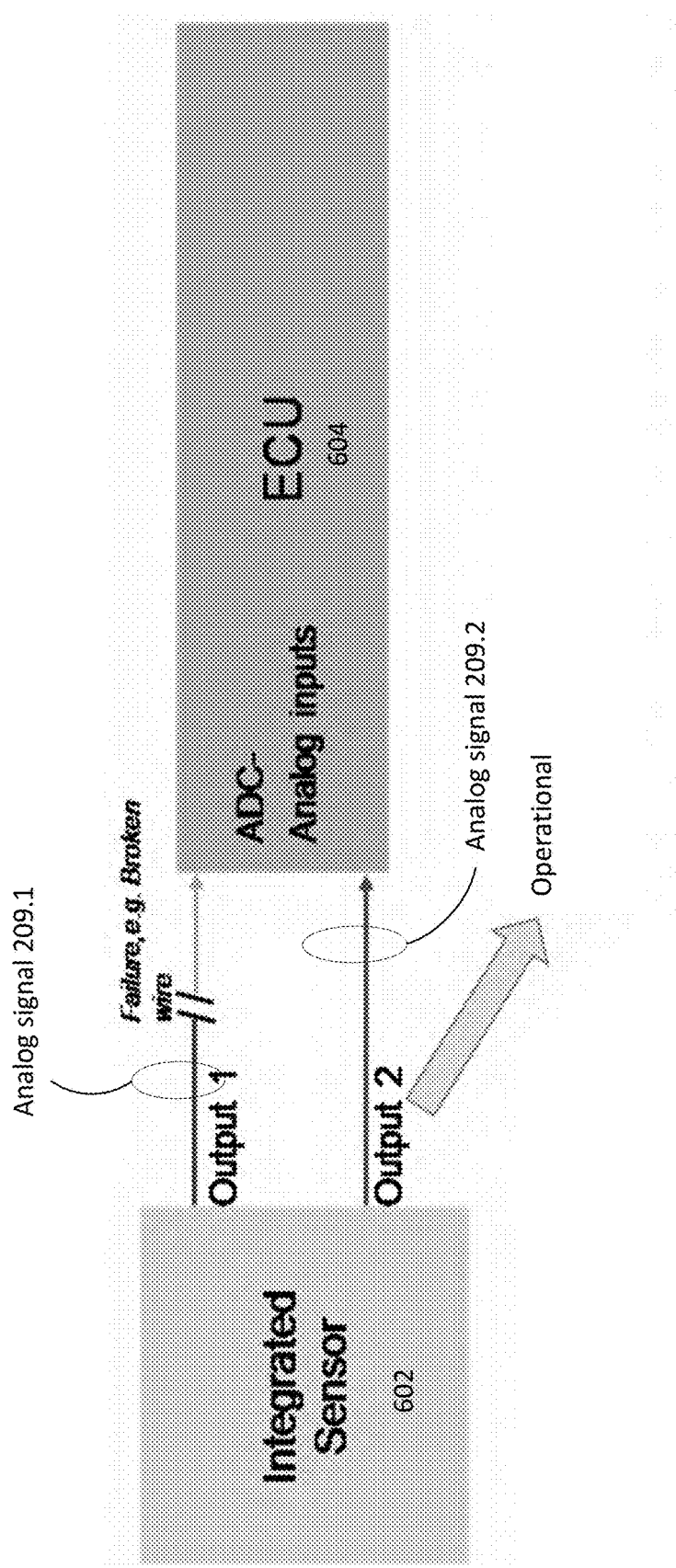
FIG. 6C illustrates a block diagram showing robustness to potential failures of the single-ended signal transmission as shown in FIGS. 6A and 6B, in accordance with one or more embodiments of the disclosure.

Regardless of whether a diversity scheme is used for transmission of the analog signals 209.1, 209.2, the transmission of a redundant analog signal facilitates an increased likelihood of the sensor measurement data being received and recovered by the ECU 604. For example, and with reference to FIG. 6C, a broken wire in a signal line used for the transmission of the analog signal 209.1 enables the ECU 604 to still recover the sensor measurement data using the analog signal 209.2, assuming that the signal represents valid sensor measurement data. In an embodiment, the ECU 604 may thus rely upon the receipt of sensor measurement data via the redundant analog signal 209.2 and identify the error with analog signal 209.1. this may be implemented, for instance, as a result of the voltage value associated with analog signal 209.1 being outside an operational range, e.g. as a result of a pull-up or pull-down resistor at the ECU side, as discussed above with reference to FIG. 4.

Figure 7:
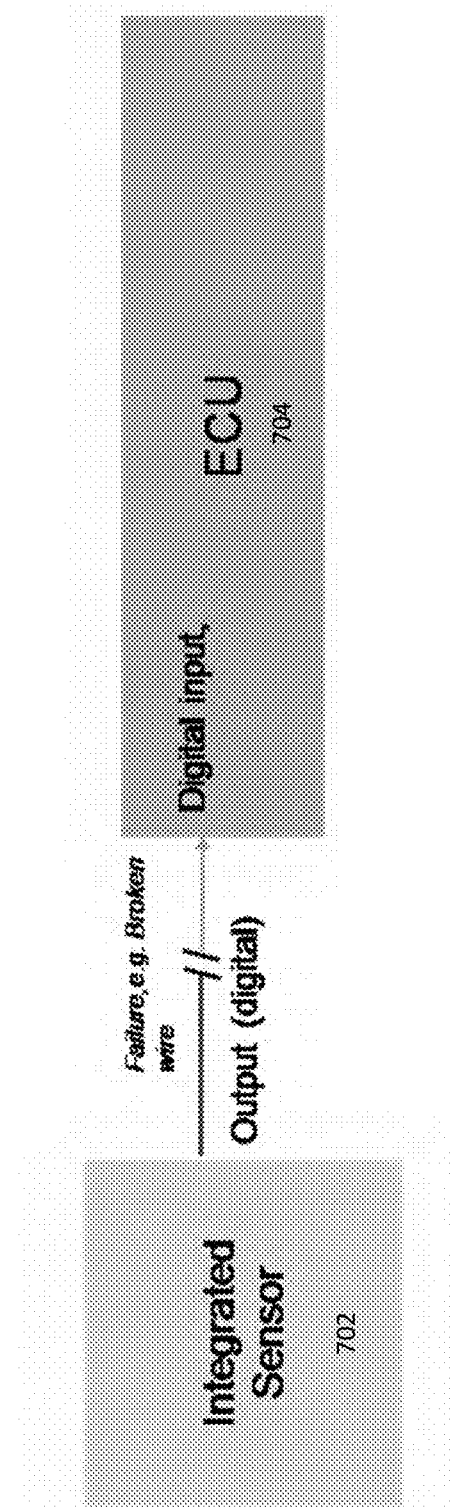
FIG. 7 illustrates another example of a conventional digital sensor interface architecture.

In contrast, the same broken signal line condition, when present in a conventional digital sensor interface architecture 700 as shown in FIG. 7, results in a total loss of the sensor measurement data. For instance, the integrated sensor 702 may be identified with the sensor 102, the main sensor measurement path, the auxiliary sensor measurement path, and the digital interface 108 as shown and discussed above with respect to FIG. 1. Thus, the digital output shown in FIG. 7 may be output from the single digital sensor interface 108 as discussed herein. The use of the single digital interface and accompanying signal lines coupling the integrated sensor 702 to the ECU 704, however, means that such a failure completely prevents the ECU from receiving sensor measurement data from the sensors 102.1, 102.2.

Embodiments additionally or alternatively include the analog interfaces 208.1, 208.2 implementing signal diversity between the analog signals 209.1, 209.2 using different types of transmission interfaces, which may use different transmission techniques for varying the voltage values of the analog signals 209.1, 209.2. This may include, for example, the analog interfaces 208.1, 208.2 using different types of transmission interfaces to effectuate the desired voltage variations on the analog signals 209.1, 209.2 in different ways. For example, and as shown in further detail in FIG. 8, one of the analog interfaces 209.1, 208.2 may be configured as a voltage interface, whereas the other analog interface 208.1, 208.2 may be configured as a current interface.

Figure 8:
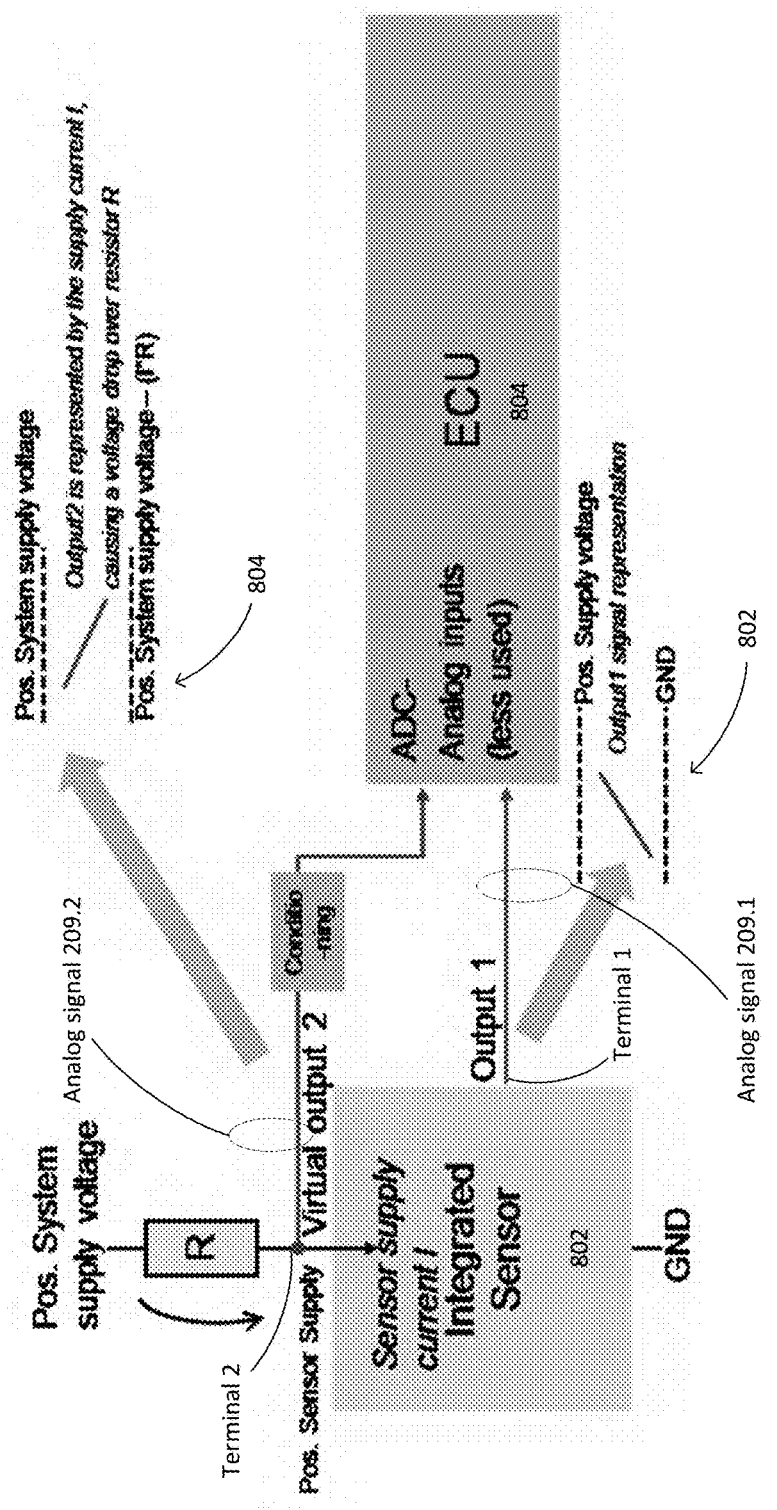
FIG. 8 illustrates a block diagram showing an additional example of signal diversity implemented with an analog sensor interface architecture, in accordance with one or more embodiments of the disclosure.

With continued reference to FIG. 8, the integrated sensor 802 may be identified with the sensor(s) 202, the main sensor measurement paths 220, and the auxiliary sensor measurement paths 230, as shown and discussed above with respect to FIGS. 2A-2D. Likewise, the ECU 804 as shown in FIG. 8 is similar or identical to the ECUs 504, 604 as discussed above with respect to FIGS. 5A-5B, and 6A-6C.

In this example, signal diversity is provided via the analog interface 208.1 being configured as a voltage interface, whereas the analog interface 208.2 is configured as a current interface. Continuing this example, the analog interface 208.1 is configured to vary the voltage at the output terminal 1, which results in a variation of voltage values associated with the analog signal 209.1 within a range of voltage values to appropriately represent the physical quantity measured by the sensor 202 or 202.1, as the case may be. Again, this may be implemented via any suitable circuitry configuration, including known techniques. Furthermore, the analog interface 208.2 is a current interface configured to vary a current drawn through the positive system supply voltage as shown in FIG. 8, which is proportional to or otherwise in relation to the physical quantity measured by the sensor 202 or 202.2. This current interface may also be implemented via any suitable circuitry configuration, including known techniques, to cause current variations in this manner. In other words, the analog interface 208.2 is configured to vary a current into the terminal 2 based upon changes in the measured sensor data over time. This variation of current drawn into the terminal 2 of the integrated sensor 802, which is used to output the analog signal 209.2, results in voltage variations across the resistor R that is also coupled to terminal 2, which in turn results in voltage variations of the analog signal 209.2 in accordance with a predetermined signalization scheme.

As a result of the signal diversity in this example, the analog signal 209.1 is transmitted having a range of voltage values in accordance with a predetermined signalization scheme as shown in the inset 802. The analog signal 209.2 is also transmitted having a range of voltage values value in accordance with a predetermined signalization as shown in the inset 804, which is then received via the ECU 804 (with additional signal conditioning or filtering as needed). However, the voltage value represented by the analog signal 209.2 is a result of a current interface used by the analog interface 209.1, in contrast to the voltage interface used by the analog interface 208.1. Thus, as discussed above, the predetermined signalization schemes may define a valid range of voltage values, but in the case of a current interface the operational range may be defined in accordance with a range of current values and the selection of an appropriate resistor value R, which is chosen to define the desired operational range of voltage values for the analog signal 209.2 in accordance with a chosen signalization scheme.

As shown in FIG. 8, in addition to the use of the different transmission interfaces, signal diversity may also be provided via the use of different signalization schemes as indicated in the insets 802, 804. For instance, in addition to the implementation of a voltage interface and a current interface for the analog interfaces 208.1, 208.2, respectively, embodiments include the signalization schemes representing an inverse of one another, as shown in the insets 802, 804. Furthermore, and as discussed herein with respect to the other configurations, the signalization schemes may also include the use of different voltage scales (e.g. the variance in voltage between minimum and maximum sensor-measured physical quantities), different valid operating ranges, etc. Thus, the signalization schemes as shown in FIG. 8 may be selected based upon desired range of voltage values (for the analog interface 208.1 that is implemented as a voltage interface) and based upon a desired range of current values (for the analog interface 802.2 that is implemented as a current interface). This type of diversity may be particularly useful, for example, to increase reliability of the transmission of signals 209.1, 209.2 in scenarios in which external influences may distort voltages and, to a lesser extent, currents, or vice-versa.

The signalization schemes shown in the insets 802, 804 indicate a different (i.e. inverse) signalization scheme with respect to one another, which may be in addition to the aforementioned signal diversity described above via the use of the different transmission interfaces. Although not shown in FIG. 8, embodiments also include the signalization schemes implemented via the analog interface 208.1, 208.2 being the same as one another, with the signal diversity being represented exclusively via the implementation of the different transmission interfaces.

Figure 9:
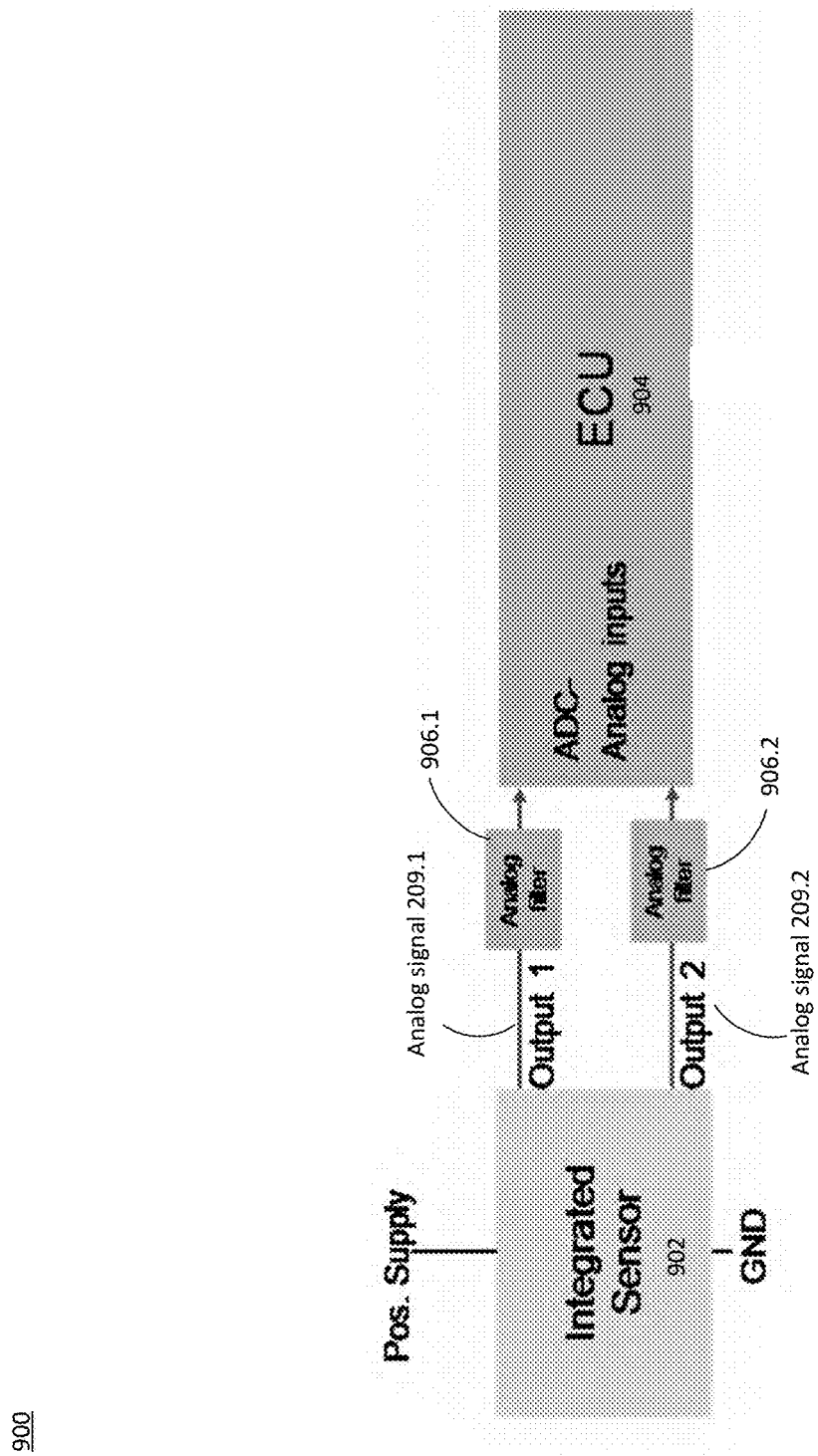
FIG. 9 illustrates a block diagram showing an example of diverse analog filtering implemented with an analog sensor interface architecture, in accordance with one or more embodiments of the disclosure.

Turning now to FIG. 9, as noted above, the analog interfaces 208.1, 208.2 in the aforementioned embodiments may implement any suitable type of signaling interface, transmission interface, and/or signalization scheme. In accordance with various embodiments, and regardless of the specific type of analog data transmission protocol that is implemented by the analog interfaces 208.1, 208.2, the analog signals 209.1, 209.2 are preferably filtered prior to being processed by the ADC included in the ECU 904 (which may be similar or identical to the aforementioned ECUs 504, 604, and 804), which is required to ensure that Electromagnetic Compatibility (EMC) requirements are met. This filtering presents a bottleneck to the overall time required for the ECU to convert and process new readings of sensor measurement data, as this time generally exceeds the time required to execute the ADC operation (on the order of a few microseconds).

Therefore, the analog output signals 209.1, 209.2 may be filtered by separate analog filters 906.1, 906.2 prior to being input to the ADC of the ECU 902. The analog filters 906.1, 906.2 may form separate filter components or be integrated as part of the ECU 904 when the ECU 904 is implemented with such filtering functionality. As a result, the analog filtering may be implemented as part of the ECU 904, for instance, using an auto-scanning feature that may be available in some ECU designs or otherwise implemented in the firmware and/or hardware of the ECU 904. The use of the analog filtering within the ECU 902 obviates the need to incorporate such filtering as part of the integrated sensor 902, allowing for a further reduction in required die space. Moreover, and regardless of how the analog filters 906.1, 906.2 are implemented, embodiments include the diversity between the analog signals 209.1, 209.2 extending to additionally or alternatively include variations among the analog filters 906.1, 906.2. Some examples of filter diversity may include, for instance, variations in filter shapes, bandwidth, etc.

EXAMPLES

The techniques of this disclosure may also be described in the following examples.

Example 1. A monolithic integrated circuit for providing diverse sensor measurement, the monolithic integrated circuit comprising: a first analog interface coupled to a first sensor measurement path, the first analog interface being configured to transmit a first analog signal indicative of sensor measurement data received from at least one sensor coupled to the first sensor measurement path; and a second analog interface coupled to a second sensor measurement path, the second analog interface being configured to transmit a second analog signal indicative of sensor measurement data received from the at least one sensor coupled to the second sensor measurement path, wherein first analog interface and the second analog interface are formed on a single die, and wherein the first analog interface and the second analog interface are physically segregated from one another within the monolithic integrated circuit.

Example 2. The monolithic integrated circuit of Example 1, wherein the first analog signal and the second analog signal are each indicative of sensor measurement data received via the at least one sensor representing the same physical quantity.

Example 3. The monolithic integrated circuit of any combination of Examples 1-2, wherein the first analog interface and the second analog interface are each configured to transmit the first analog signal and the second analog signal such that at least a portion the first analog signal is transmitted while at least a portion of the second analog signal is also transmitted.

Example 4. The monolithic integrated circuit of any combination of Examples 1-3, wherein: the first analog interface is configured to transmit the first analog signal in accordance with a first analog data transmission protocol, and the second analog interface is configured to transmit the second analog signal in accordance with a second analog data transmission protocol; and the first analog data transmission protocol is different than the second analog data transmission protocol.

Example 5. The monolithic integrated circuit of any combination of Examples 1-4, wherein the first analog interface is configured to transmit the first analog signal using a first signalization scheme that uses a first range of voltage values, and wherein the second analog interface is configured to transmit the second analog signal using a second signalization scheme that uses a second range of voltage values representing an inverse of the first range of voltage values.

Example 6. The monolithic integrated circuit of any combination of Examples 1-5, wherein the first analog interface is a voltage interface configured to transmit the first analog signal by varying a voltage at a terminal used to output the first analog signal, and wherein the second analog interface is a current interface configured to transmit the second analog signal by varying a current at a terminal used to output the second analog signal.

Example 7. The monolithic integrated circuit of any combination of Examples 1-6, wherein the first analog interface and the second analog interface are each configured to transmit the first analog signal and the second analog signal, respectively, in accordance with a signalization scheme that defines a voltage range indicative of valid sensor measurement data, and wherein the voltage range indicative of valid sensor measurement data less than an upper clamping range and greater than an upper clamping range.

Example 8. The monolithic integrated circuit of any combination of Examples 1-7, wherein the at least one sensor is a magnetic sensor.

Example 9. The monolithic integrated circuit any combination of Examples 1-8, wherein at least one of the first analog interface or the second analog interface comprises a differential analog interface.

Example 10. The monolithic integrated circuit any combination of Examples 1-9, wherein at least one of the first analog interface or the second analog interface comprises a single-ended analog interface.

Example 11. The monolithic integrated circuit of any combination of Examples 1-10, wherein the first sensor measurement path and the second sensor measurement path are coupled to one another and receive the sensor measurement data from the at least one sensor via at least one component that is common to the first sensor measurement path and the second sensor measurement path.

Example 12. The monolithic integrated circuit of any combination of Examples 1-11, wherein the at least one component that is common to the first sensor measurement path and the second sensor measurement path includes one or more of an analog-to-digital converter and a digital signal processor.

Example 13. A circuit for providing diverse sensor measurement, the circuit comprising: a first analog interface coupled to a first sensor measurement path, the first analog interface being configured to transmit a first analog signal indicative of sensor measurement data received from a first sensor coupled to the first sensor measurement path; and a second analog interface coupled to a second sensor measurement path, the second analog interface being configured to transmit a second analog signal indicative of sensor measurement data received from a second sensor coupled to the second sensor measurement path, wherein the first analog interface and the second analog interface are configured to receive redundant sensor measurement data via the first sensor and the second sensor, respectively.

Example 14. The circuit of Example 13, wherein the first analog interface and the second analog interface are each configured to transmit the first analog signal and the second analog signal such that at least a portion the first analog signal is transmitted while at least a portion of the second analog signal is also transmitted.

Example 15. The circuit of any combination of Examples 13-14, wherein the circuit is a monolithic integrated circuit that includes the first analog interface and the second analog interface formed on a single die as part of a monolithic integrated circuit, and wherein the first analog interface and the second analog interface are physically segregated from one another within the monolithic integrated circuit.

Example 16. The circuit of any combination of Examples 13-15, wherein: the first analog interface is configured to transmit the first analog signal in accordance with a first analog data transmission protocol, and the second analog interface is configured to transmit the second analog signal in accordance with a second analog data transmission protocol; and the first analog data transmission protocol is different than the second analog data transmission protocol.

Example 17. The circuit of any combination of Examples 13-16, wherein the first analog interface is configured to transmit the first analog signal using a first signalization scheme that uses a first range of voltage values, and wherein the second analog interface is configured to transmit the second analog signal using a second signalization scheme that uses a second range of voltage values representing an inverse of the first range of voltage values.

Example 18. The circuit of any combination of Examples 13-17, wherein the first analog interface is a voltage interface configured to transmit the first analog signal by varying a voltage at a terminal used to output the first analog signal, and wherein the second analog interface is a current interface configured to transmit the second analog signal by varying a current at a terminal used to output the second analog signal.

Example 19. The circuit of any combination of Examples 13-18, wherein the first analog interface and the second analog interface are each configured to transmit the first analog signal and the second analog signal, respectively, in accordance with a signalization scheme that defines a voltage range indicative of valid sensor measurement data, and wherein the voltage range indicative of valid sensor measurement data less than an upper clamping range and greater than an upper clamping range.

Example 20. The circuit of any combination of Examples 13-19, wherein the first analog signal and the second analog signal are each indicative of sensor measurement data received via the first sensor and the second sensor, respectively, representing the same physical quantity.

Example 21. The circuit according to any combination of Examples 13-20, wherein each of the first sensor and the second sensor is a magnetic sensor.

Example 22. The circuit according to any combination of Examples 13-21, wherein at least one of the first analog interface or the second analog interface comprises a differential analog interface.

Example 23. The circuit according to any combination of Examples 13-22, wherein at least one of the first analog interface or the second analog interface comprises a single-ended analog interface.

Conclusion

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A monolithic integrated circuit for providing diverse sensor measurement, the monolithic integrated circuit comprising:
    a first analog interface coupled to a first sensor measurement path, the first analog interface being configured to transmit a first analog signal indicative of a first analog value that corresponds to a first physical quantity, which is based upon sensor measurement data received from at least one sensor coupled to the first sensor measurement path; and
    a second analog interface coupled to a second sensor measurement path, the second analog interface being configured to transmit a second analog signal indicative of a second analog value that corresponds to a second physical quantity, which is based upon sensor measurement data received from the at least one sensor coupled to the second sensor measurement path,
    wherein first analog interface and the second analog interface are formed on a single die,
    wherein the first analog interface and the second analog interface are physically segregated from one another within the monolithic integrated circuit,
    wherein the first analog interface and the second analog interface are each configured to transmit the first analog signal and the second analog signal, respectively, in accordance with a signalization scheme that defines a voltage range indicative of valid sensor measurement data, and
    wherein the voltage range indicative of valid sensor measurement data is less than an upper clamping range and greater than a lower clamping range.

2. The monolithic integrated circuit of claim 1, wherein the first analog signal and the second analog signal are each indicative of sensor measurement data received via the at least one sensor representing the same physical quantity.

3. The monolithic integrated circuit of claim 1, wherein the first analog interface and the second analog interface are each configured to transmit the first analog signal and the second analog signal such that at least a portion the first analog signal is transmitted while at least a portion of the second analog signal is also transmitted.

4. The monolithic integrated circuit of claim 1, wherein:
    the first analog interface is configured to transmit the first analog signal in accordance with a first analog data transmission protocol, and
    the second analog interface is configured to transmit the second analog signal in accordance with a second analog data transmission protocol; and
    the first analog data transmission protocol is different than the second analog data transmission protocol.

5. The monolithic integrated circuit according to claim 1, wherein the at least one sensor is a magnetic sensor.

6. The monolithic integrated circuit according to claim 1, wherein at least one of the first analog interface or the second analog interface comprises a differential analog interface.

7. The monolithic integrated circuit according to claim 1, wherein at least one of the first analog interface or the second analog interface comprises a single-ended analog interface.

8. The monolithic integrated circuit of claim 1, wherein the first sensor measurement path and the second sensor measurement path are coupled to one another and receive the sensor measurement data from the at least one sensor via at least one component that is common to the first sensor measurement path and the second sensor measurement path.

9. The monolithic integrated circuit of claim 8, wherein the at least one component that is common to the first sensor measurement path and the second sensor measurement path includes one or more of an analog-to-digital converter and a digital signal processor.

10. The monolithic integrated circuit according to claim 1, wherein the first analog interface is configured to transmit the first analog signal based upon a first formatted digital data signal, which is generated based upon the sensor measurement data received from the first sensor, and
    wherein the second analog interface is configured to transmit the second analog signal based upon a second formatted digital data signal, which is generated based upon the sensor measurement data received from the second sensor.

11. A circuit for providing diverse sensor measurements, the circuit comprising:
    a first analog interface coupled to a first sensor measurement path, the first analog interface being configured to transmit a first analog signal indicative of a first analog value that corresponds to a first physical quantity, which is based upon sensor measurement data received from a first sensor coupled to the first sensor measurement path; and
    a second analog interface coupled to a second sensor measurement path, the second analog interface being configured to transmit a second analog signal indicative of a second analog value that corresponds to a second physical quantity, which is based upon sensor measurement data received from a second sensor coupled to the second sensor measurement path, wherein the first analog interface and the second analog interface are configured to receive redundant sensor measurement data via the first sensor and the second sensor, respectively, wherein the first analog interface and the second analog V interface are each configured to transmit the first analog signal and the second analog signal, respectively, in accordance with a signalization scheme that defines a voltage range indicative of valid sensor measurement data, and wherein the voltage range indicative of valid sensor measurement data is less than an upper clamping range and greater than a lower clamping range.

12. The circuit of claim 11, wherein the first analog interface and the second analog interface are each configured to transmit the first analog signal and the second analog signal such that at least a portion the first analog signal is transmitted while at least a portion of the second analog signal is also transmitted.

13. The circuit of claim 11, wherein the circuit is a monolithic integrated circuit that includes the first analog interface and the second analog interface formed on a single die as part of a monolithic integrated circuit, and
wherein the first analog interface and the second analog interface are physically segregated from one another within the monolithic integrated circuit.

14. The circuit of claim 11, wherein:
the first analog interface is configured to transmit the first analog signal in accordance with a first analog data transmission protocol,
the second analog interface is configured to transmit the second analog signal in accordance with a second analog data transmission protocol, and
the first analog data transmission protocol is different than the second analog data transmission protocol.

15. The circuit of claim 11, wherein the first analog signal and the second analog signal are each indicative of sensor measurement data received via the first sensor and the second sensor, respectively, representing the same physical quantity.

16. The circuit according to claim 11, wherein each of the first sensor and the second sensor is a magnetic sensor.

17. The circuit according to claim 11, wherein at least one of the first analog interface or the second analog interface comprises a differential analog interface.

18. The circuit according to claim 11, wherein at least one of the first analog interface or the second analog interface comprises a single-ended analog interface.

19. The circuit according to claim 11,
wherein the first analog interface is configured to transmit the first analog signal based upon a first formatted digital data signal, which is generated based upon the sensor measurement data received from the first sensor, and
wherein the second analog interface is configured to transmit the second analog signal based upon a second formatted digital data signal, which is generated based upon the sensor measurement data received from the second sensor.

20. A monolithic integrated circuit, comprising:
a first analog interface coupled to a first sensor measurement path, the first analog interface being configured to transmit a first analog signal indicative of a first analog value that corresponds to a first physical quantity, which is based upon sensor measurement data received from at least one sensor coupled to the first sensor measurement path; and a second analog interface coupled to a second sensor measurement path, the second analog interface being configured to transmit a second analog signal indicative of a second analog value that corresponds to a second physical quantity, which is based upon sensor measurement data received from the at least one sensor coupled to the second sensor measurement path,
wherein first analog interface and the second analog interface are formed on a single die,
wherein the first analog interface and the second analog interface are physically segregated from one another within the monolithic integrated circuit,
wherein the first analog interface is configured to transmit the first analog signal using a first signalization scheme that uses a first range of voltage values, and
wherein the second analog interface is configured to transmit the second analog signal using a second signalization scheme that uses a second range of voltage values representing an inverse of the first range of voltage values.

21. A monolithic integrated circuit, comprising:
a first analog interface coupled to a first sensor measurement path, the first analog interface being configured to transmit a first analog signal indicative of a first analog value that corresponds to a first physical quantity, which is based upon sensor measurement data received from at least one sensor coupled to the first sensor measurement path; and
a second analog interface coupled to a second sensor measurement path, the second analog interface being configured to transmit a second analog signal indicative of a second analog value that corresponds to a second physical quantity, which is based upon sensor measurement data received from the at least one sensor coupled to the second sensor measurement path,
wherein first analog interface and the second analog interface are formed on a single die,
wherein the first analog interface and the second analog interface are physically segregated from one another within the monolithic integrated circuit,
wherein the first analog interface is a voltage interface configured to transmit the first analog signal by varying a voltage at a terminal used to output the first analog signal, and
wherein the second analog interface is a current interface configured to transmit the second analog signal by varying a current at a terminal used to output the second analog signal.

22. A circuit for providing diverse sensor measurements, the circuit comprising:
a first analog interface coupled to a first sensor measurement path, the first analog interface being configured to transmit a first analog signal indicative of a first analog value that corresponds to a first physical quantity, which is based upon sensor measurement data received from a first sensor coupled to the first sensor measurement path; and
a second analog interface coupled to a second sensor measurement path, the second analog interface being configured to transmit a second analog signal indicative of a second analog value that corresponds to a second physical quantity, which is based upon sensor measurement data received from a second sensor coupled to the second sensor measurement path, wherein the first analog interface and the second analog interface are configured to receive redundant sensor measurement data via the first sensor and the second sensor, respectively, wherein the first analog interface is configured to transmit the first analog signal using a first signalization scheme that uses a first range of voltage values, and wherein the second analog interface is configured to transmit the second analog signal using a second signalization scheme that uses a second range of voltage values representing an inverse of the first range of voltage values.

23. A circuit for providing diverse sensor measurements, the circuit comprising:

a first analog interface coupled to a first sensor measurement path, the first analog interface being configured to transmit a first analog signal indicative of a first analog value that corresponds to a first physical quantity, which is based upon sensor measurement data received from a first sensor coupled to the first sensor measurement path; and a second analog interface coupled to a second sensor measurement path, the second analog interface being configured to transmit a second analog signal indicative of a second analog value that corresponds to a second physical quantity, which is based upon sensor measurement data received from a second sensor coupled to the second sensor measurement path, wherein the first analog interface and the second analog interface are configured to receive redundant sensor measurement data via the first sensor and the second sensor, respectively, wherein the first analog interface is a voltage interface configured to transmit the first analog signal by varying a voltage at a terminal used to output the first analog signal, and wherein the second analog interface is a current interface configured to transmit the second analog signal by varying a current at a terminal used to output the second analog signal.

* * * * *